US009810976B2

(12) United States Patent
Minefuji

(10) Patent No.: US 9,810,976 B2
(45) Date of Patent: Nov. 7, 2017

(54) PROJECTION OPTICAL SYSTEM

(71) Applicant: SEIKO EPSON CORPORATION, Tokyo (JP)

(72) Inventor: Nobutaka Minefuji, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/189,564

(22) Filed: Jun. 22, 2016

(65) Prior Publication Data

US 2016/0306268 A1 Oct. 20, 2016

Related U.S. Application Data

(63) Continuation of application No. 15/003,200, filed on Jan. 21, 2016, now abandoned.

(30) Foreign Application Priority Data

Jan. 27, 2015 (JP) ................... 2015-013031

(51) Int. Cl.
*G02B 3/00* (2006.01)
*G02B 9/00* (2006.01)
(Continued)

(52) U.S. Cl.
CPC ............. *G03B 21/147* (2013.01); *G02B 7/04* (2013.01); *G02B 15/161* (2013.01); *G02B 15/20* (2013.01); *G02B 17/0852* (2013.01); *G02B 17/0896* (2013.01); *G02B 27/0025* (2013.01); *G03B 21/006* (2013.01); *G03B 21/28* (2013.01); *H04N 9/315* (2013.01); *G02B 3/02* (2013.01); *G02B 5/005* (2013.01); *G02B 13/009* (2013.01);
(Continued)

(58) Field of Classification Search
CPC .. G02B 27/0025; G02B 13/18; G02B 13/009; G02B 15/14; G02B 13/16; G02B 13/0045; G02B 17/08; G02B 5/005; G02B 13/0065; G02B 13/22; G02B 17/0816; G02B 3/02; G03B 21/28; G03B 17/54; G03B 5/00
USPC ................ 359/649–651, 663, 676, 678, 679, 359/683–685, 689, 691, 716, 717, 359/726–728, 732–736, 740, 784
See application file for complete search history.

(56) References Cited

U.S. PATENT DOCUMENTS 7,549,755 B2   6/2009   Suzuki
8,014,075 B2   9/2011   Minefuji
(Continued)

FOREIGN PATENT DOCUMENTS

JP   2006-235516 A   9/2006
JP   2007-079524 A   3/2007
(Continued)

OTHER PUBLICATIONS

Jun. 14, 2016 Search Report issued in European Patent Application No. 16152791.6.

*Primary Examiner* — Evelyn A Lester
(74) *Attorney, Agent, or Firm* — Oliff PLC

(57) ABSTRACT

The 1-2nd lens group is divided into three lens groups which move when focusing is performed during the magnification change. Even in a case in which the second optical group is formed of one mirror, it is possible for a primary image to contain appropriate aberration and to hereby reduce aberration of an image which is finally projected onto a screen through the second optical group.

18 Claims, 23 Drawing Sheets

(51) Int. Cl.

| | | |
|---|---|---|
| *G02B 17/00* | (2006.01) | |
| *G03B 21/14* | (2006.01) | |
| *G02B 27/00* | (2006.01) | |
| *G03B 21/28* | (2006.01) | |
| *G02B 15/16* | (2006.01) | |
| *G02B 15/20* | (2006.01) | |
| *G02B 7/04* | (2006.01) | |
| *G03B 21/00* | (2006.01) | |
| *H04N 9/31* | (2006.01) | |
| *G02B 3/02* | (2006.01) | |
| *G02B 13/00* | (2006.01) | |
| *G02B 17/08* | (2006.01) | |
| *G02B 13/16* | (2006.01) | |
| *G02B 15/14* | (2006.01) | |
| *G02B 13/22* | (2006.01) | |
| *G03B 5/00* | (2006.01) | |
| *G02B 5/00* | (2006.01) | |
| *G02B 13/18* | (2006.01) | |
| *G03B 17/54* | (2006.01) | |

(52) U.S. Cl.
CPC ...... *G02B 13/0045* (2013.01); *G02B 13/0065* (2013.01); *G02B 13/16* (2013.01); *G02B 13/18* (2013.01); *G02B 13/22* (2013.01); *G02B 15/14* (2013.01); *G02B 17/08* (2013.01); *G02B 17/0816* (2013.01); *G03B 5/00* (2013.01); *G03B 17/54* (2013.01)

(56) References Cited

U.S. PATENT DOCUMENTS

| | | | |
|---|---|---|---|
| 8,029,147 | B2 | 10/2011 | Suzuki |
| 8,071,965 | B2 | 12/2011 | Nishikawa et al. |
| 8,113,664 | B2 | 2/2012 | Nagarekawa et al. |
| 8,157,386 | B2 | 4/2012 | Nagarekawa et al. |
| 8,217,374 | B2 | 7/2012 | Nishikawa et al. |
| 8,419,191 | B2 | 4/2013 | Nagase et al. |
| 9,645,362 | B2 * | 5/2017 | Minefuji ................ G02B 17/08 |
| 9,671,598 | B2 * | 6/2017 | Minefuji ................ G02B 1/041 |
| 2008/0158439 | A1 | 7/2008 | Nishikawa |
| 2010/0310724 | A1 | 12/2010 | Nakata et al. |
| 2014/0340658 | A1 | 11/2014 | Takano et al. |

FOREIGN PATENT DOCUMENTS

| | | |
|---|---|---|
| JP | 2007-147970 A | 6/2007 |
| JP | 2008-250296 A | 10/2008 |
| JP | 2009-134254 A | 6/2009 |
| JP | 2009-216981 A | 9/2009 |
| JP | 2010-181672 A | 8/2010 |
| JP | 2012-203139 A | 10/2012 |

* cited by examiner

PROJECTION OPTICAL SYSTEM

This is a Continuation of U.S. application Ser. No. 15/003,200 filed Jan. 21, 2016, which claims the benefit of Japanese Patent Application No. 2015-013031, filed Jan. 27, 2015. The disclosure of the prior applications are hereby incorporated by reference herein in their entirety.

BACKGROUND

1. Technical Field

The present invention relates to a projection optical system suitable for being incorporated in a projector which performs enlargement projection of an image of an image display element.

2. Related Art

A refraction optical system configured to include a plurality of lenses as a projection optical system for a projector which can perform projection from a short distance and can obtain a large picture plane by having a wide angle of view substantially equal to a half angle of view of 60 degrees, is proposed (see JP-A-2007-147970). However, in a case where a significantly wide angle of view is obtained by the refraction optical system configured only of the lenses, there are drawbacks in that, particularly, a lens disposed on the enlargement side is likely to be enormously increased in side. In addition, when the refraction optical system performs projection at a wide angle of view, it is considered that a large number of lenses are needed in order to correct chromatic aberration of magnification occurring by a negative meniscus lens which is positioned on the enlargement side and has great power.

As a method to solve the drawbacks of the refraction optical system, a refraction optical system formed of a plurality of lenses and a refraction/reflection complex optical system which uses at least one curved reflective mirror have been proposed (for example, see JP-A-2006-235516 and JP-A-2007-079524). In the refraction/reflection complex optical system, since a reflective mirror is used as a final unit which obtains a wide angle of view, the chromatic aberration of magnification is unlikely to occur, compared to the refraction optical system using only the lenses described above.

However, for example, in JP-A-2006-235516, a significantly wide angle of view is obtained using the refraction optical system and a concave mirror; however, the curved mirror needs to be enormously increased in size and the entire length thereof needs to be enormously increased. In addition, in JP-A-2007-079524, for example, the angle of view is about 60 degrees in the eighth example, a mirror size is decreased by combining a concave mirror and a convex mirror. However, similar to JP-A-2006-235516, the entire length needs to be enormously increased. In addition, the F-number is about 3 and it is dark and an optical system using a transmissive liquid crystal is defective in terms of brightness. Moreover, two mirrors have a aspheric surface, which causes difficulty in terms of achieving accuracy and assembly.

As above, in the refraction/reflection complex optical system, an ultra-wide angle of view is obtained but it is difficult to decrease the entire length, and thereby there are drawbacks in that the mirror is increased in size. For example, the system is not suitable for equipment such as a front projector in which portability is important.

In comparison, a system in which a reflective mirror is used as a front projector has been known (JP-A-2008-250296, JP-A-2012-203139, or the like). For example, in JP-A-2008-250296, one or two aspheric lens is disposed before a aspheric mirror, and thereby a compact configuration is achieved; however, in a system having brightness with the F-number of about 1.7, a range of magnification change is narrowed to about 1.2 times. Conversely, in a system having a range of magnification change of about 2 times, it is dark with the F-number of about 1.85. In addition, in JP-A-2012-203139, a positive lens is disposed closest to the mirror side in the refraction optical system, and thereby it is possible to miniaturize the mirror, which enables the entire optical system to be miniaturized. However, since the system is applied only to the F-number of about 1.8, sufficient brightness is not obtained.

Incidentally, in the related art, a projector for the proximity application is usually used by being fixed during installment such as ceiling installment or wall installment, with respect to a fixed screen. However, recently, there is a high demand that not only the projector is disposed upright and performs projection onto a table surface with a relatively small projection size, but also the projector moves to a relatively large room and can be applied to a large picture plane projection. In a case of the large picture plane projection, in order to obtain sufficient contrast even in a relatively bright place, there is a need to use a bright optical system even to a small extent.

SUMMARY

An advantage of some aspects of the invention is to provide a projection optical system which can cover a wide range of magnification change in an application to a proximity type projector and can be applied to an image display element having high resolution.

A projection optical system according to an aspect of the invention includes: in order from a reduction side, a first optical group which is formed of a plurality of lenses and has positive power; and a second optical group which has one reflective surface having a concave aspheric shape. The first optical group is formed to include a 1-1st lens group which is fixed when focusing is performed during the magnification change and has positive power, and a 1-2nd lens group which moves when focusing is performed during the magnification change, is formed of a plurality of lenses, and has positive power as a whole. The 1-2nd lens group is a lens group which individually moves when focusing is performed during the magnification change, and includes three lens groups of a positive F1 lens group formed of at least two lenses, F2 lens group formed of two lenses, and F3 lens group formed of one negative lens.

First, in this case of the configuration described above, the first optical group plays a role of causing an image of an object, that is, a panel, to be formed as an image in front of a mirror of the second optical group and forming a primary image in order to form an image again on a screen by the mirror of the second optical group. At this time, since the second optical group is configured only of one mirror, it is difficult to individually correct aberration. Accordingly, in order to obtain a final image having small aberration on the screen by the second optical group, there is a need to form the primary image containing aberration in the first optical group.

Further, in the ultra-wide angle projection optical system having the configuration described above, when the projection magnification is changed, the aberration fluctuation is likely to increase because an angle of view is abnormally wide. Accordingly, the first optical group needs to form the primary image which contains aberration corresponding to the change of image forming magnification even when the image forming magnification is changed.

In comparison, in the projection optical system according to the aspect of the invention, as described above, the 1-2nd lens group of the first optical group is divided into three lens groups and the groups move when focusing is performed during the magnification change, and thereby it is possible to form the primary image which is needed to obtain a good image on the screen. In other words, in the application of the proximity type projector, it is possible to cover a wide range of magnification change and to be applied to an image display element having high resolution.

In a specific aspect of the invention, the 1-2nd lens group includes one aspheric lens formed of a resin, as the F3 lens group disposed on the outermost enlargement side.

In order to finally obtain a good image through the aspheric mirror of the second optical group, the primary image containing aberration corresponding to the first optical group needs to be formed. In addition, in order to form the primary image corresponding to the wide range of magnification change, at least one aspheric lens needs to be included in the 1-2nd lens group as a focusing group.

In a case in which the focusing group is configured of one aspheric lens, it is effective that the aspheric lens is included in the F3 lens group (lens group disposed on the outermost enlargement side) which is the lens group immediately before the second optical group (aspheric mirror). The F3 lens group is caused to change the distance with respect to the second optical group when focusing is performed during the magnification change, and thereby it is possible to finally enhance the contrast and to obtain a final image having low distortion.

In addition, in the refraction and reflection complex optical system having the ultra-wide angle, since a light flux from the first optical group formed of the refraction optical system is reflected from the mirror of the second optical group and returns to the first optical group, there is a concern that the lens of the first optical group on the second optical group side will interfere with the light flux returning from the second optical group. Therefore, there is no need to have a circular shape but there is a need to have a partially notched shape. Accordingly, it is effective to use a lens formed of a resin in terms of low cost and miniaturization.

In another aspect of the invention, the F2 lens group of the three lens groups configuring the 1-2nd lens group includes a biconvex lens and a biconcave lens in this order from the reduction side.

In this case, in the 1-2nd lens group, the F2 lens group can limit an angle of the light flux incident to the F3 lens group.

The F3 lens group can be, for example, a aspheric lens formed of a resin; however, since the material has a significant shrinkage factor as general characteristics of a resin-molded lens, it is difficult to secure accuracy of size of the surfaces, compared to the glass-molded lens. In addition, when the power becomes excessively strong, an uneven thickness ratio representing a ratio of the lens thickness in the vicinity of the optical axis and the lens thickness at the outer circumferential portion is increased. Then, it is possible to have an influence on the performance because internal distortion is likely to occur at a gate portion or at the outer circumferential portion.

As described above, since the lens disposed on the enlargement side of the first optical group can interfere with the light flux returning from the reflective mirror configuring the second optical group, the lens may have a non-circular shape in a case. In this case, it is highly possible for the internal distortion or the like to increase, compared to a normal circular lens. Accordingly, when the light flux is incident to the resin lens at a gentle angle, it is preferable that an error in the surface shape or an error in the refractive index in the lens is unlikely to have an influence on the system.

Therefore, in the F2 lens group, the biconvex lens and the biconcave lens are disposed from the reduction side, the convex surface of the F2 lens group faces the reduction side, and the concave surface thereof faces the enlargement side, and thereby it is possible for the light flux to be incident to the F3 lens group at an appropriate angle such that it is possible to achieve good performance in a wide range of the magnification change.

In still another aspect of the invention, a positive lens and a negative lens configuring the F2 lens group forms a cemented lens. In this case, it is possible to achieve sensitivity reduction during attachment of the F2 lens group. For example, in a case where the picture plane height to be projected needs to be lowered, there is a possibility that the F2 lens group needs to have a non-circular shape, similar to the case where a part of the F3 lens group described above is configured of the aspheric lenses having a notched shape. When the lens has the non-circular shape, a frame of the lens is formed to have the non-circular shape, not the normal circular shape. Therefore, it is difficult to maintain frame accuracy or assembly accuracy. Accordingly, the F2 lens group is configured of the cemented lens of the positive lens and the negative lens, and thereby sensitivity of the assembly is reduced even in a case of a non-cylindrical shape.

In still another aspect of the invention, in the 1-2nd lens group, the F1 lens group is configured of at least two positive lenses, the F2 lens group is configured of two lenses of a biconvex lens and a biconcave lens in this order from the reduction side, and the F3 lens group is configured of a resin lens having negative power and having both surfaces subjected to a aspheric surface process. In this case, in the 1-2nd lens group configuring the focusing group, at least five lenses of at least two positive lenses, biconvex and biconcave lenses, and one aspheric lens are disposed, and thereby it is possible to obtain a compact system and a good image even in a wide range of magnification change.

In still another aspect of the invention, the 1-1st lens group has an aperture therein, a positive lens and at least a negative lens are disposed on the enlargement side from the aperture in this order from the reduction side, and the negative lens has at least one surface subjected to a aspheric shape process.

The 1-1st lens group plays a role of effectively receiving the light flux from the object, that is, the panel and sending the light flux to a focusing lens group configured of the 1-2nd lens group. At least two lenses are disposed on the enlargement side from the aperture disposed in the 1-1st lens group, and thereby it is possible to form an appropriate intermediate image by the 1-2nd lens group in the wide range of the magnification change such that it is possible to finally obtain a good image.

Further, the 1-1st lens group is configured to include one positive lens and at least one negative lens on the enlargement side from the aperture of the 1-1st lens group in this order from the reduction side, further, one lens with at least one surface of the negative lens subjected to the aspheric surface process is disposed, and thereby the 1-1st lens group is combined with the focusing lens group of the 1-2nd lens group. Then, even when one aspheric lens is included in the plurality of lenses configuring the 1-2nd lens group, it is possible to advantageously correct field curvature and astigmatism characteristics in the wide range of the magnification change such that it is possible to obtain stable performance.

In still another aspect of the invention, the 1-1st lens group has an aperture therein, at least two sets of cemented lenses of positive lenses and negative lenses disposed on the reduction side from the aperture, and a negative lens having at least one surface subjected to a aspheric shape process.

The plurality of lenses disposed on the reduction side from the aperture of the 1-1st lens group play a role of effectively receiving the light flux from the object, that is, the panel. In a case where the plurality of lenses are configured of only the spherical lenses, there is a possibility that the number of lenses needs to be increased. When the number of lenses is increased, transmittance is reduced, the entire length of the lens is increased due to the increase of the lenses, and the configurational number of lenses needs to be set to the minimum extent.

For example, in order to cover the brightness having F-number of about 1.6, at least one aspheric surface having the concave shape is included on the reduction side from the aperture of the 1-1st lens group, thereby the brightness is secured, the occurrence of flare is suppressed, and it is possible to provide an image having high contrast. In addition, at least two sets of cemented lenses are configured to be disposed on the reduction side from the aperture of the 1-1st lens group, thereby the occurrence of chromatic aberration is suppressed to the smallest extent, and assembling properties are enhanced by cementing.

In still another aspect of the invention, the negative lens subjected to a aspheric shape process, which is disposed on the reduction side from the aperture disposed in the 1-1st lens group is a negative meniscus lens and has at least a aspheric surface on the concave surface side. In this case, the negative lens at the corresponding positions has a negative meniscus shape and at least the concave surface side has the aspheric shape. In this manner, the 1-1st lens group is configured of the small number of lenses, and the numerical aperture is efficiently secured. Further, the spherical aberration and comatic aberration is satisfactorily corrected, contrast is enhanced, and it is possible to obtain an image having small flare.

In still another aspect of the invention, the numerical aperture on the object side is equal to or more than 0.3. In this case, it is possible to form a sufficiently bright projection image.

In still another aspect of the invention, the reduction side is substantially telecentric.

In still another aspect of the invention, elements configuring the first optical group and the second optical group all have a rotationally symmetric system.

In still another aspect of the invention, a range of magnification change is equal to or greater than 1.5 times.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a projection optical system according to an embodiment of the invention will be described in detail with reference to the drawings.

Figure 1:
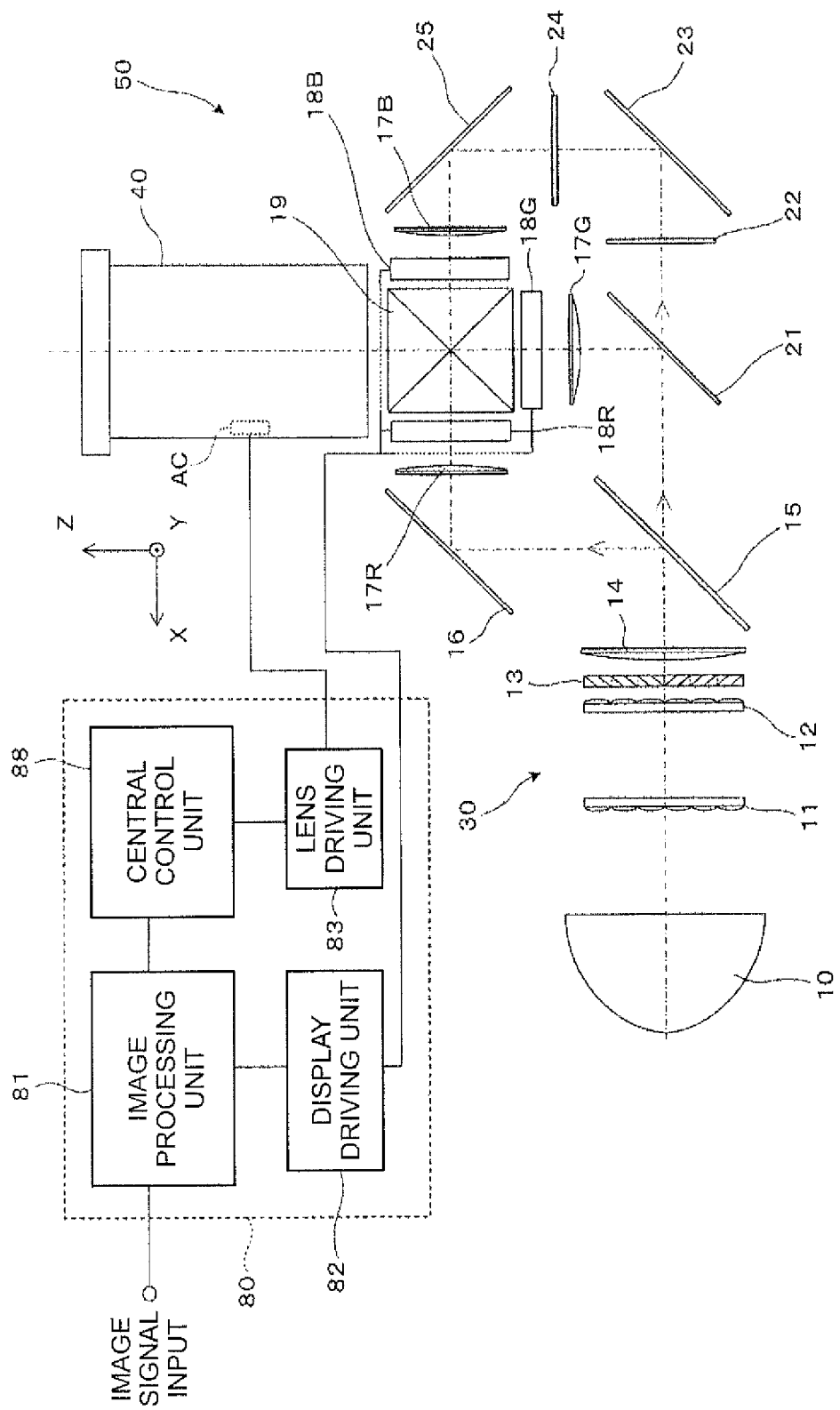
FIG. 1 is a diagram showing a schematic configuration of a projector in which a projection optical system of an embodiment is incorporated.

As illustrated in FIG. 1, a projector 2, in which the projection optical system according to an embodiment of the invention is incorporated, includes an optical system section 50 which projects an image light flux, and a circuit device 80 which controls an operation of the optical system section 50.

In the optical system section 50, a light flux source 10 is, for example, an extra-high pressure mercury lamp, and emits light fluxes including an R light flux, a G light flux, and a B light flux. The light flux source 10 may be a discharge light flux source, in addition to an extra-high pressure mercury lamp, or may be a solid-state light flux source, such as an LED or a laser. A first integrator lens 11 and a second integrator lens 12 have a plurality of lens elements arranged in an array. The first integrator lens 11 divides a light flux from the light flux source 10 into a plurality of light fluxes. Each lens element of the first integrator lens 11 condenses the light flux from the light flux source 10 in the vicinity of the lens elements of the second integrator lens 12. The lens elements of the second integrator lens 12 form images of the lens elements of the first integrator lens 11 on the liquid crystal panels 18R, 18G, and 18B in cooperation with a superimposing lens 14. In this configuration, the entire display regions of the liquid crystal panels 18R, 18G, and 18B are illuminated with a light flux from the light flux source 10, in substantially uniform brightness.

A polarization conversion element 13 converts a light flux from the second integrator lens 12 to a predetermined linearly polarized light flux. The superimposing lens 14 superimposes the image of each lens element of the first integrator lens 11 on the display regions of the liquid crystal panels 18R, 18G, and 18B through the second integrator lens 12.

A first dichroic mirror 15 reflects the R light flux incident from the superimposing lens 14 and transmits the G light flux and the B light flux. The R light flux reflected from the first dichroic mirror 15 is incident to the liquid crystal panel 18R serving as an optical modulator through a reflective mirror 16 and a field lens 17R. The liquid crystal panel 18R modulates the R light flux in response to an image signal so as to form an R-color image.

A second dichroic mirror 21 reflects the G light flux from the first dichroic mirror 15 and transmits the B light flux. The G light flux reflected from the second dichroic mirror 21 is incident to the liquid crystal panel 18G serving as an optical modulator through a field lens 17G. The liquid crystal panel 18G modulates the G light flux in response to an image signal to form a G-color image. The B light flux transmitted through the second dichroic mirror 21 is incident to the liquid crystal panel 18B serving as an optical modulator through relay lenses 22 and 24, reflective mirrors 23 and 25, and a field lens 17B. The liquid crystal panel 18B modulates the B light flux in response to an image signal to form a B-color image.

A cross dichroic prism 19 is a prism for light flux composition, combines light fluxes modulated by the liquid crystal panels 18R, 18G, and 18B to form an image light flux, and causes the image light flux to travel to a projection optical system 40.

The projection optical system 40 is a zoom lens for projection, which projects an image light modulated by the liquid crystal panels 18G, 18R, and 18B and combined by the cross dichroic prism 19 onto a screen (not shown) on an enlarged scale.

The circuit device 80 includes an image processing unit 81 to which an external image signal, such as a video signal, is input, a display driving unit 82 which drives the liquid crystal panels 18G, 18R, and 18B provided in the optical system section 50 on the basis of an output of the image processing unit 81, a lens driving unit 83 which operates a driving mechanism (not shown) provided in the projection optical system 40 to adjust a state of the projection optical system 40, and a central control unit 88 which performs overall control of the operations of the circuit portions 81, 82, and 83, and the like.

The image processing unit 81 converts the input external image signal to an image signal including the tone of each color or the like. The image processing unit 81 may perform various image processes, such as distortion correction or color correction, on the external image signal.

The display driving unit 82 can operate the liquid crystal panels 18G, 18R, and 18B on the basis of an image signal output from the image processing unit 81, and can form an image corresponding to the image signal or an image corresponding to an image signal subjected to the image process, on the liquid crystal panels 18G, 18R, and 18B.

The lens driving unit 83 operates under the control of the central control unit 88, and appropriately moves some optical components configuring the projection optical system 40 along an optical axis OA through an actuator AC, thereby it is possible to perform focusing during magnification change in projection of an image on a screen by the projection optical system 40. Further, the lens driving unit 83 can change a vertical position of the image projected on the screen, through adjustment of a tilt at which the entire projection optical system 40 moves vertically perpendicular to the optical axis OA.

Figure 2:
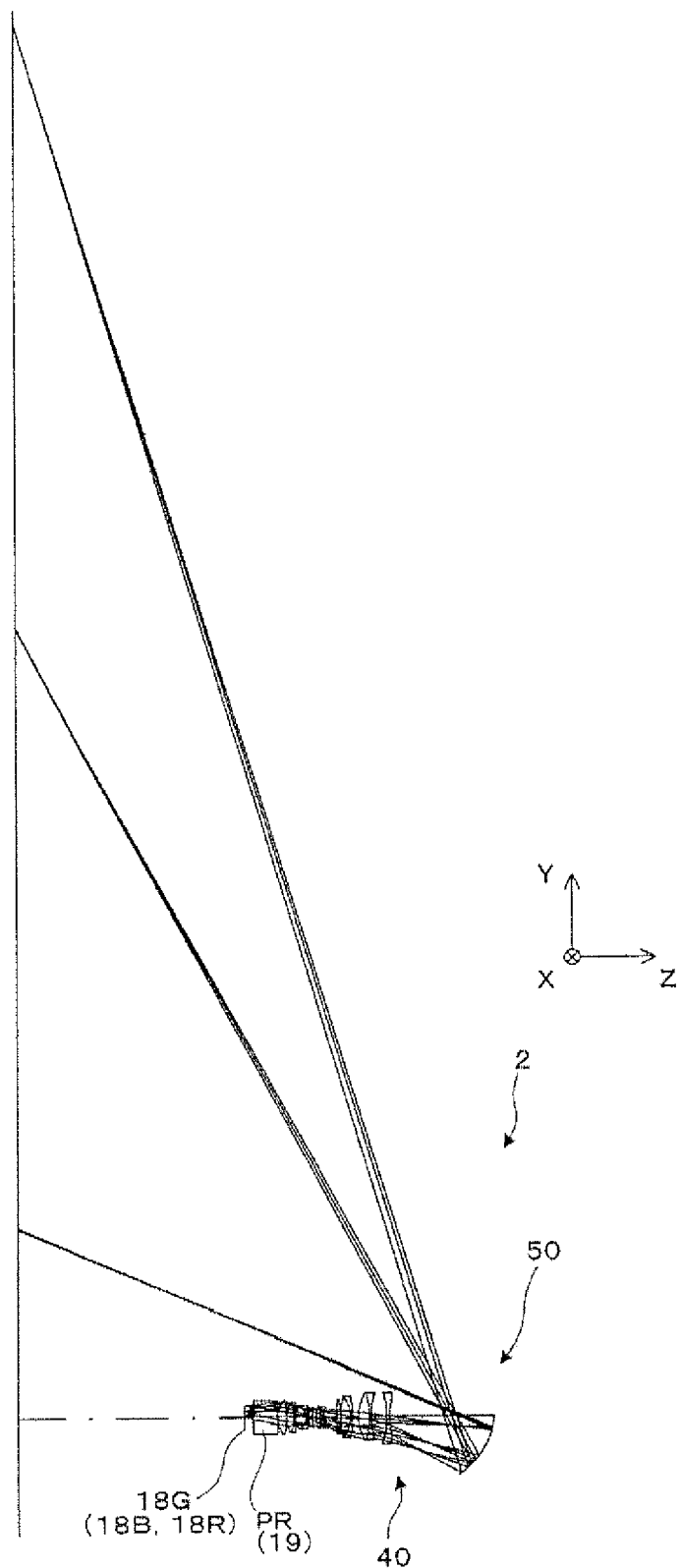
FIG. 2 is a diagram showing light fluxes and a configuration from an object surface to a projection surface in the projection optical system of the embodiment or Example 1.
Figure 3:
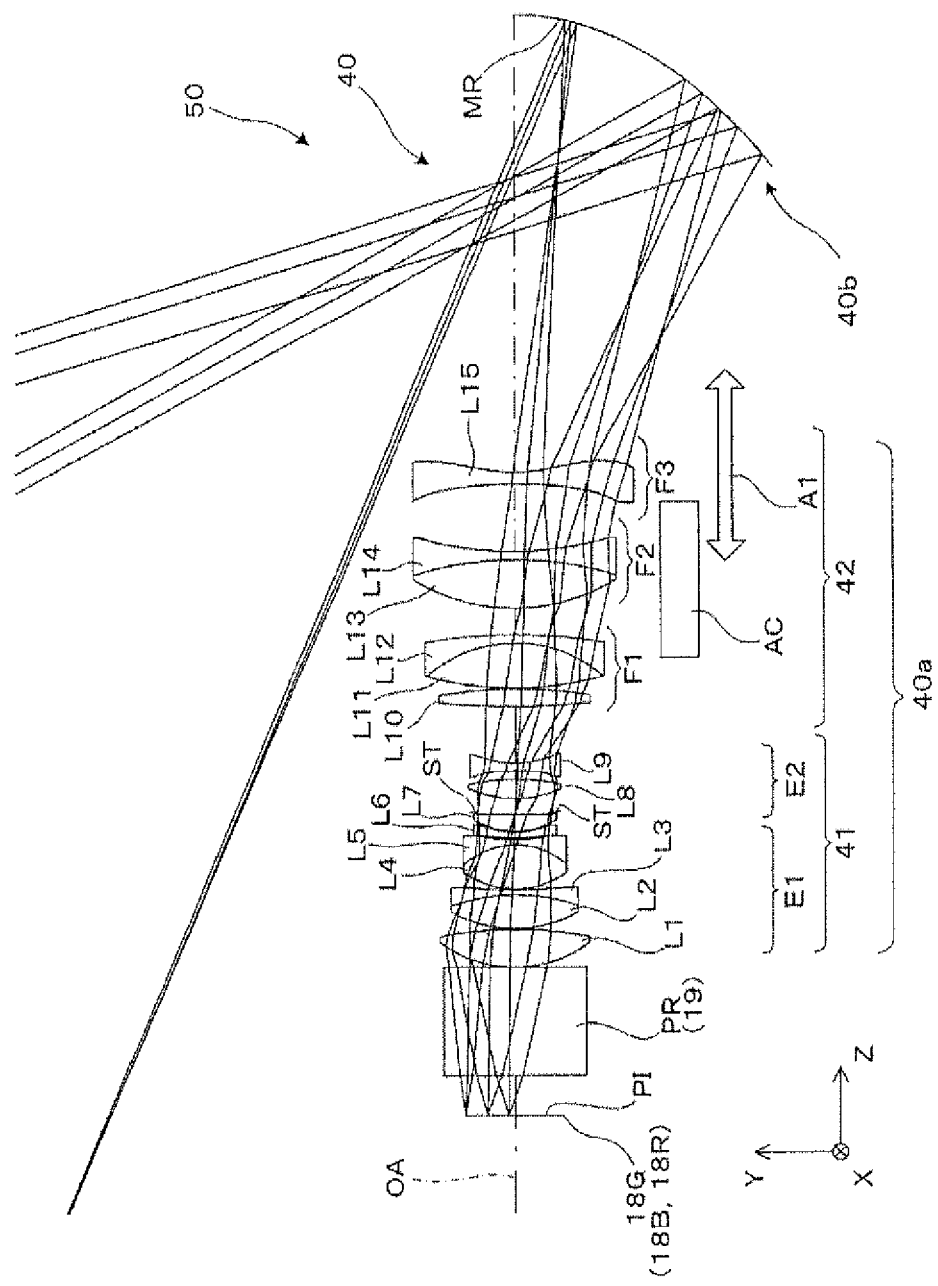
FIG. 3 is an enlarged diagram showing a part from the object surface to a concave reflective mirror in FIG. 2.

Hereinafter, the projection optical system 40 of the embodiment will be specifically described with reference to FIG. 2 and FIG. 3. The projection optical system 40 illustrated in FIG. 2 or the like has the same configuration as the projection optical system 40 of Example 1 to be described below.

The projection optical system 40 of the embodiment projects an image formed on a projection-performed surface of the liquid crystal panel 18G (18R or 18B), onto a screen (not shown). A prism PR corresponding to the cross dichroic prism 19 in FIG. 1 is disposed between the plane of projection optical system 40 and the liquid crystal panel 18G (18R or 18B).

The projection optical system 40 includes a first optical group 40a which is formed of a plurality of lenses and has positive power and a second optical group 40b which is configured of one mirror MR with a reflective surface having a concave aspheric shape. The first optical group 40a is fixed when focusing is performed during the magnification change, and is formed to have a 1-1st lens group 41 having positive power and a 1-2nd lens group 42 which moves when focusing is performed during the magnification change, is formed of a plurality of lens groups, and has positive power as a whole.

The 1-1st lens group 41 has an aperture ST inside thereof and is formed to have a lens group E1 on a reduction side from the aperture ST and a lens group E2 on an enlargement side from the aperture ST.

The 1-2nd lens group 42 has, in order from the reduction side, three lens groups of a positive F1 lens group (hereinafter, lens group F1), which is formed of at least two (in an example in FIG. 3, three) lenses, an F2 lens group (hereinafter, lens group F2) which is formed of two lenses, and an F3 lens group (hereinafter, lens group F3) which is formed of one negative lens. The lens groups F1 to F3 are caused to individually move, for each lens group by the actuator AC, in a direction A1 along the optical axis OA when focusing is performed during magnification change. Further, the actuator AC can cause the lens groups F1 to F3 to move in various modes by performing of the focusing during magnification change and, for example, the groups moving individually may be linked to each other using a cam mechanism or the like.

Hereinafter, the lenses configuring each lens group will be described in order from the reduction side. Of the first optical group 40*a*, the lens group E1 of the 1-1st lens group 41 has seven lenses L1 to L7 and the lens group E2 thereof has two lenses L8 and L9. The lens group F1 of the 1-2nd lens group 42 has three lenses L10 to L12, the lens group F2 thereof has two lenses L13 and L14, and the lens group F3 thereof has one lens L15. In other words, the first optical group 40*a* is configured to have 15 lenses L1 to L15 as a whole.

Of the lenses L1 to L7 configuring the lens group E1, the lens L2 as a positive lens and the lens L3 as a negative lens form a cemented lens, and the lens L4 and the lens L5 form a cemented lens. Further, the lens L6 is a negative aspheric glass lens. In other words, the 1-1st lens group 41 has at least two sets of cemented lenses of the positive lenses and the negative lenses on the reduction side from the aperture ST and has a negative lens having at least one surface with aspheric shape formed. Particularly, the lens L6 as the negative lens, on which the aspheric shape is formed, is a negative meniscus lens and has the aspheric surface on at least a concave side. Further, of the lenses configuring the lens group E1, the lenses other than the lens L6 are spherical glass lenses. In addition, the lenses L1 to L7 have a circular shape which is symmetric about the optical axis OA.

For the two lenses L8 and L9 configuring the lens group E2, the lenses L8 is the positive lens and the lens L9 is the negative lens. Particularly, the lens L9 is a negative aspheric glass lens. In other words, the 1-1st lens group 41 has one positive lens and at least one negative lens, in order from the reduction side on the enlargement side from the aperture ST and aspheric shape is formed on one surface of the at least corresponding lens. Further, lens L8 is a spherical glass lens. In addition, the lenses L8 and L9 have a circular shape which is symmetric about the optical axis OA.

Of the lenses L10 to L12 configuring the lens group F1, lens L10 is a positive biconvex lens. In addition, the lens L11 and the lens L12 form a cemented lens, and the cemented lens functions as a positive lens as a whole. In other words, it is also possible to consider that the lens group F1 is configured to have two positive lenses. Further, the lenses L10 to L12 are spherical glass lenses and have a circular shape which is symmetric about the optical axis OA.

Of the lenses L13 and L14 configuring the lens group F2, the lens L13 is a biconvex lens (positive lens), and the lens L14 is a biconcave lens (negative lens). In addition, the lens L13 and the lens L14 form a cemented lens. Further, the lenses L13 and L14 are spherical glass lenses and have a circular shape which is symmetric about the optical axis OA.

One lens L15 configuring the lens group F3 disposed on the farthest enlargement side of the lens groups is a lens (aspheric lens) having negative power with both surfaces subjected to a aspheric surface process and a lens (resin lens) formed of a resin. Further, the lens L15 does not have a circular shape but has a shape in which a part on the upper side (side onto which an image light is projected) is notched from a state of a circle which is symmetric about the optical axis OA.

The second optical group 40*b* is configured of one mirror MR having a concave aspheric shape and the mirror MR reflects the image light emitted from the first optical group 40*a*, and thereby projects the image light to a screen.

Further, in the projection optical system 40, all of the lenses L1 to L15 configuring the first optical group 40*a* have a circular shape which is symmetric about the optical axis OA or a shape with a notched part and the mirror MR configuring the second optical group 40*b* also has a partially notched shape from a circular shape which is symmetric about the optical axis OA. In other words, elements configuring the first optical group 40*a* and the second optical group 40*b* all belong to a rotationally symmetric system. In addition, as shown in FIG. 1, the reduction side in the projection optical system 40 is substantially telecentric. For example, as described above, in a case where light fluxes modulated by the respective liquid crystal panels 18R, 18G, and 18B in the cross dichroic prism 19 are combined into an image light, it is possible to hereby easily absorb variations due to assembly.

Such a short throw projection optical system above has an abnormally short distance to a screen. In the projection optical system 40 described above, an object positioned on a panel surface PI of the liquid crystal panel 18G (18R or 18B), that is, an image on a panel, in the first optical group 40*a*, is temporarily formed as an image in front of a mirror of the second optical group 40*b*, is again formed as an image on a screen by one mirror MR configuring the second optical group 40*b*, and thereby short throw projection is performed in the first optical group 40*a*. In other words, in this case, the first optical group 40*a* plays a role of forming a primary image (intermediate image) in front of the mirror MR. In the projection as described above, aberration fluctuation due to focusing during magnification change is greater than a case of general projection, and thus it is common not to have a significantly large range of magnification change. Accordingly, the primary image formed by the first optical group 40*a* needs to be compatible even in a case where, when an angle of view is abnormally wide and thus projection magnification is changed, the aberration fluctuation is likely to increase. In addition, in the short throw projection optical system, it is easy to increase contrast reduction due to field curvature and astigmatism fluctuation which directly influence on image performance, and distortion due to movement of a focus group is highly likely to be also increased more than in a normal lens system.

In comparison, it is possible to perform effective correction so as to suppress the aberration fluctuation to be small by changing a gap between the lens group including aspheric lens disposed on the first optical group 40*a* and a aspheric mirror of the second optical group 40*b*. Since such correction can be performed, in the present embodiment, as described above, the lenses in the 1-2nd lens group 42 are divided into a plurality of three lens groups F1 to F3 and perform movement when focusing is performed during the magnification change. Even in a case where the second optical group 40*b* is configured of one mirror MR, it is possible to hereby achieve a good image having small aberration, compared to an image of which the primary image has moderate aberration, and which is finally projected on the screen through the second optical group 40*b*. In other words, in the projector 2 as a proximity type projector, a wide range of magnification change is covered and it is possible to be also applied to an image display element having high resolution.

In the first optical group 40*a*, when one aspheric lens is included in the lenses configuring the 1-2nd lens group 42 as a focusing group disposed on the enlargement side, there is a concern that a sufficient range of magnification change will not be secured by a design. When two aspheric lenses are included in the 1-2nd lens group 42, it is possible to widen the range of the magnification change; however, in this case, in order to sufficiently widen the range of the magnification change, the shape of each aspheric lens is highly likely to have a highly aspheric shape as a significantly different surface shape from the spherical shape, surface sensitivity or refractive index sensitivity becomes high, further eccentricity sensitivity between surfaces also becomes high, and there is a high possibility that variation in the final lens performance is likely to be increased.

In comparison, in the present embodiment, instead of that one aspheric lens (lens L15) is included in the 1-2nd lens group 42 as the focusing group, a aspheric glass surface (lens L9) is effectively disposed on the enlargement side from the aperture ST in the 1-1st lens group 41, and thereby it is possible to suppress an enhancement in sensitivity by having one aspheric resin lens disposed in the 1-2nd lens group 42 and it is possible to reduce the aberration fluctuation even in a wide range of the magnification change.

In addition, for the aspheric lens (lens L15) of the 1-2nd lens group 42, in order to prevent interference with a light flux reflected from the mirror of the second optical group 40b, not only there is a need to have an atypical shape such as a partially notched circular shape, but also, a aspheric resin-molded surface is normally used because the diameter is relatively increased such that, in the present embodiment, the lens L15 is also a aspheric resin lens having an atypical shape. However, the aspheric resin-molded surface also has lower accuracy than the aspheric glass-molded surface, and thus there is a need to sufficiently reduce sensitivity at the time of the design because the system is likely to be influenced by variations due to surface accuracy or refractive index as described above. Therefore, in the present embodiment, in the F2 lens group disposed on the reduction side (upstream side on an optical path) of the lens L15 (F3 lens group) as a aspheric lens of the 1-2nd lens group 42, a biconvex lens and a biconcave lens are disposed from the reduction side, a convex surface faces the reduction side of the F2 lens group, a concave surface faces the enlargement side, and thereby a light flux incident to the lenses L15 is adjusted to have an appropriate angle and the sensitivity in the lens L15 is suppressed to be reduced.

Further, in the 1-1st lens group 41, if a configuration on the reduction side from the aperture ST has only the spherical lenses, it is considered that it is possible to be applied only to brightness having the F-number of about 1.8, when applied to a wide range of the magnification change. In comparison, in the present embodiment, the aspheric glass surface (lens L6) is appropriately disposed on the reduction side from the aperture ST, and thereby it is possible to achieve an image having less flare and high contrast even at the F-number of about 1.6. Even when the number of (in the present embodiment, 15) lenses is substantially the same as an example in the related art, the numerical aperture on the object side is equal to or more than 0.3, that is, with brightness having the F-number of about 1.6, a range of magnification change of high magnification of 1.5 (further, equal to or more than 1.6) is secured, and performance of sufficient application to the image display element having high resolution is achieved.

EXAMPLE

Hereinafter, a specific example of the projection optical system 40 will be described. Meanings of specifications common in Examples 1 to 4 in the following description are defined as follows.

f Focal Length of Entire system
ω Half Angle of View
Na Numerical Aperture
R Curvature Radius
D Surface Interval in Optical Axis (Lens Thickness in Optical Axis Or Lens Interval in Optical Axis)
Nd Refractive Index of d line
Vd Abbe Number of d line The aspheric surface is defined by the following polynomial equation (aspheric surface equation).

$$z = \frac{ch^2}{1+\sqrt{1-(k+1)c^2h^2}} + A_4h^4 + A_6h^6 + A_8h^8 + A_{10}h^{10} + A_{12}h^{12} + A_{14}h^{14}$$

Here,
c: Curvature (1/R)
h: Height From Optical Axis
k: Coefficient Of Conic Of Aspheric Surface
$A_i$: Coefficient Of Aspheric Surface In High Order Equation Example 1

Data of lens surfaces of Example 1 is shown in Table 1. Further, OBJ means the panel surface PI and STO means the aperture ST. In addition, a surface having "*" after a surface reference number means a surface having aspheric shape.

TABLE 1

| | f 3.753 | | | |
| | ω 72.7 | | | |
| | NA 0.313 | | | |
| | R | D | Nd | Vd |
|---|---|---|---|---|
| OBJ | Infinity | 9.500 | | |
| 1 | Infinity | 25.970 | 1.51633 | 64.14 |
| 2 | Infinity | 0.000 | | |
| 3 | 29.749 | 9.200 | 1.61800 | 63.33 |
| 4 | −90.854 | 0.200 | | |
| 5 | 31.147 | 8.000 | 1.49700 | 81.54 |
| 6 | −46.319 | 1.200 | 1.80518 | 25.42 |
| 7 | 115.301 | 0.200 | | |
| 8 | 21.01 | 10.500 | 1.48749 | 70.24 |
| 9 | −18.367 | 1.200 | 1.90366 | 31.31 |
| 10 | 40.142 | 0.400 | | |
| *11 | 22.722 | 1.400 | 1.58913 | 61.15 |
| *12 | 14.117 | 0.300 | | |
| 13 | 19.166 | 4.000 | 1.48749 | 70.24 |
| 14 | 223.258 | 0.671 | | |
| STO | Infinity | 3.142 | | |
| 16 | 26.258 | 4.600 | 1.84666 | 23.78 |
| 17 | −52.237 | 2.067 | | |
| *18 | −101.023 | 1.800 | 1.74320 | 49.29 |
| *19 | 20.505 | variable interval | | |
| 20 | 198.906 | 4.200 | 1.64769 | 33.79 |
| 21 | −105.554 | 0.200 | | |
| 22 | 82.236 | 10.800 | 1.62004 | 36.26 |
| 23 | −32.21 | 2.000 | 1.80518 | 25.42 |
| 24 | −127.875 | variable interval | | |
| 25 | 47.079 | 11.500 | 1.58144 | 40.75 |
| 26 | −83.369 | 2.000 | 1.80518 | 25.42 |
| 27 | 83.369 | variable interval | | |
| *28 | −146.264 | 2.800 | 1.53116 | 56.04 |
| *29 | 35.005 | variable interval | | |
| *30 | −54.303 | variable interval | reflective surface | |
| 31 | Infinity | | | |

In Table 1 and the following Tables, an exponent of 10 (for example, 1.00×10+18) is described using E (for example, 1.00E+18).

Table 2 shows a aspheric surface coefficient of a lens surface of Example 1.

TABLE 2

Aspheric Surface Coefficient

| | K | A04 | A06 | A08 | A10 | A12 | A14 |
|---|---|---|---|---|---|---|---|
| 11 | −1.4162 | −3.1275E−04 | 2.1480E−06 | −4.7918E−09 | 0.0000E+00 | 0.0000E+00 | 0.0000E+00 |
| 12 | −1.9911 | −2.5613E−04 | 2.3305E−06 | −9.6210E−09 | 1.5979E−11 | 0.0000E+00 | 0.0000E+00 |
| 18 | −1.0000 | −8.9299E−05 | 0.0000E+00 | 0.0000E+00 | 0.0000E+00 | 0.0000E+00 | 0.0000E+00 |
| 19 | 0.6743 | −7.5262E−05 | 1.0469E−07 | −5.4544E−10 | 0.0000E+00 | 0.0000E+00 | 0.0000E+00 |
| 28 | −104.8836 | −1.3716E−05 | 2.6918E−08 | −3.8636E−11 | 2.1555E−14 | −6.2068E−18 | 0.0000E+00 |
| 29 | 0.0000 | −3.3687E−05 | 4.9222E−08 | −7.9903E−11 | 7.8149E−14 | −4.7186E−17 | 1.2130E−20 |
| 30 | −0.9865 | 5.6413E−08 | 3.8062E−11 | −5.3064E−14 | 1.7923E−17 | −3.1309E−21 | 2.1598E−25 |

Table 3 shows values of variable intervals 19, 24, 27, 29, and 30 in Table 2 at the projection magnification of 125 times, the projection magnification of 100 times, and the projection magnification of 169 times.

TABLE 3

Variable Interval

| | 125× | 100× | 169× |
|---|---|---|---|
| 19 | 13.506 | 13.945 | 13.203 |
| 24 | 6.445 | 4.000 | 8.916 |
| 27 | 16.200 | 17.836 | 14.500 |
| 29 | 110.000 | 110.369 | 109.532 |
| 30 | −501.000 | −409.990 | −666.138 |

Figure 4:
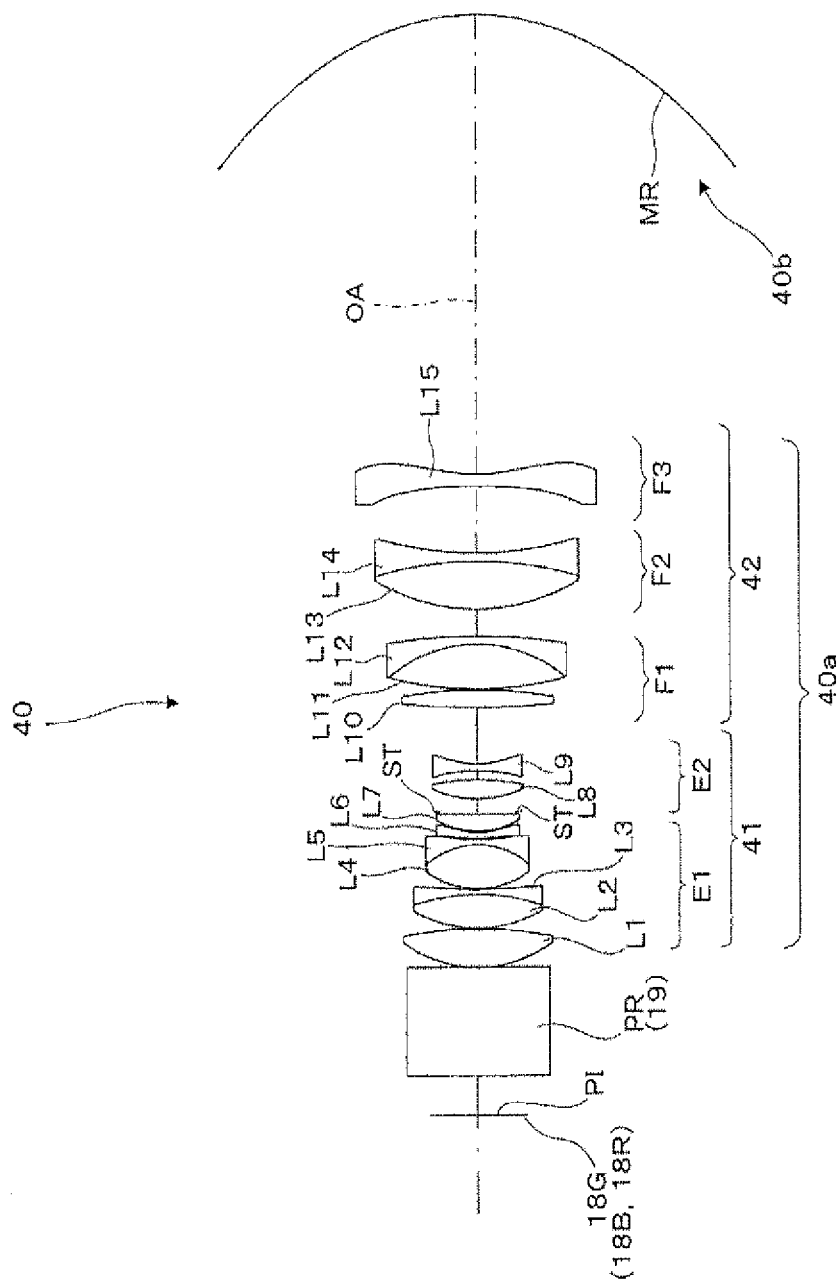
FIG. 4 is a diagram showing a configuration of the projection optical system of Example 1.

FIG. 4 is a sectional diagram showing the projection optical system of Example 1. The projection optical system in FIG. 4 corresponds to the projection optical system 40 of Embodiment 1. Further, the lens L15 or the mirror MR having a partially notched shape from a circle in FIG. 3 or the like is depicted intact without a notch in FIG. 4. In FIG. 4, the projection optical system performs enlargement projection of an image on the panel surface PI to the screen at a magnification depending on a distance. In other words, the projection optical system has 15 lenses L1 to L15 of the lenses L1 to L7 configuring the lens group E1 of the 1-1st lens group 41, the lenses L8 and L9 configuring the lens group E2 thereof, the lenses L10 to L12 configuring the lens group F1 of 1-2nd lens group 42, the lenses L13 and L14 configuring the lens group F2 thereof, and the lens L15 configuring the lens group F3 thereof, in this order from the reduction side. For example, as in a case where projection onto a wall surface is changed to projection onto a floor surface, the magnification change occurs due to the change of a projection position (change of projection distance), and the 1-1st lens group 41 is fixed as is when focusing is performed during the magnification change, whereas the lens groups F1 to F3 configuring the 1-2nd lens group 42 individually move.

Further, the respective lenses L1 to L15 will be described in detail. In the 1-1st lens group 41, the lens L1 as a first lens is a positive lens, the lens L2 as a second lens is a positive lens, the lens L3 as a third lens is a negative lens, the lens L2 and the lens L3 form a cemented lens, the lens L4 as a fourth lens is a positive lens, the lens L5 as a fifth lens is a negative lens, the lens L4 and the lens L5 form a cemented lens, the lens L6 as a sixth lens is a negative meniscus lens having both surfaces subjected to a aspheric surface process, the lens L7 as a seventh lens is a positive lens with a convex surface facing the reduction side, L8 and the lens L9 as a ninth lens is a biconcave lens having both surfaces subjected to a aspheric surface process. In addition, in the 1-2nd lens group 42, the lens L10 as a tenth lens is a positive lens, the lens L11 as an eleventh lens is a positive lens, the lens L12 as a twelfth lens is a negative lens, the lens L11 and the lens L12 form a cemented lens, the lens L13 as a thirteenth lens is a positive lens, the lens L14 as a fourteenth lens is a negative lens, the lens L13 and the lens L14 form a cemented lens, and the lens L15 as a fifteenth lens is a negative lens having both surfaces subjected to a aspheric surface process. In addition, the second optical group 40b is configured of one mirror having a concave aspheric surface.

Figure 5A:
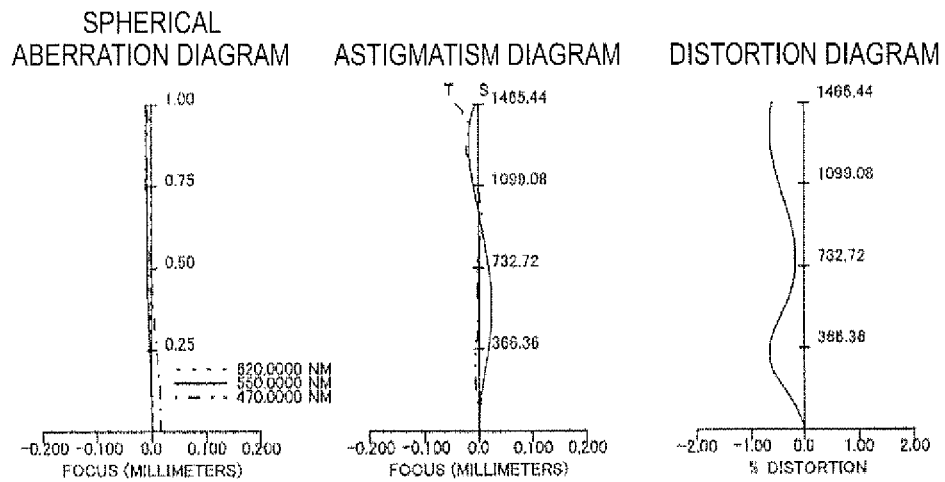
FIGS. 5A to 5C are diagrams showing aberration on a reduction side of the projection optical system of Example 1.
Figure 5B:
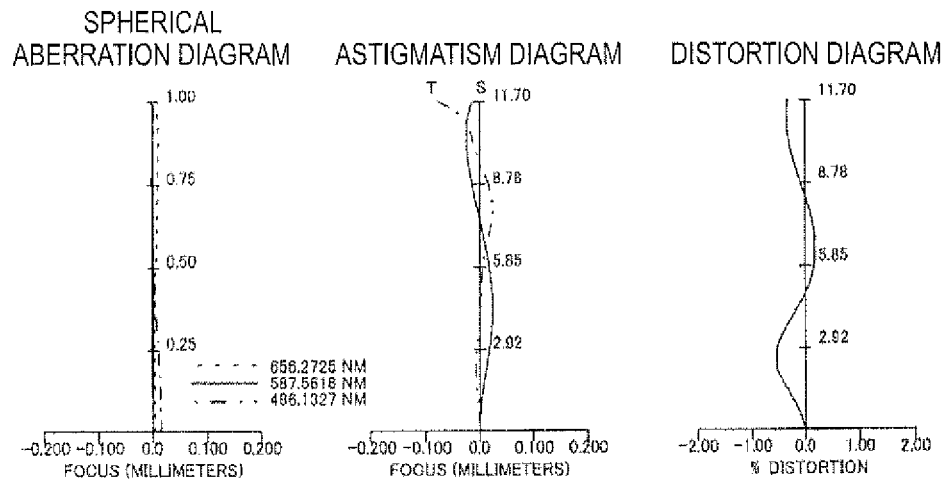
Figure 5C:
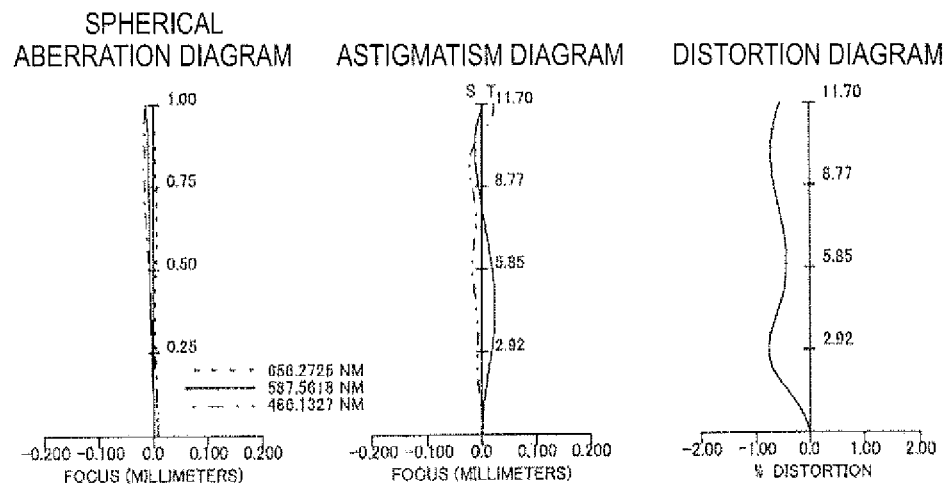
Figure 6A:
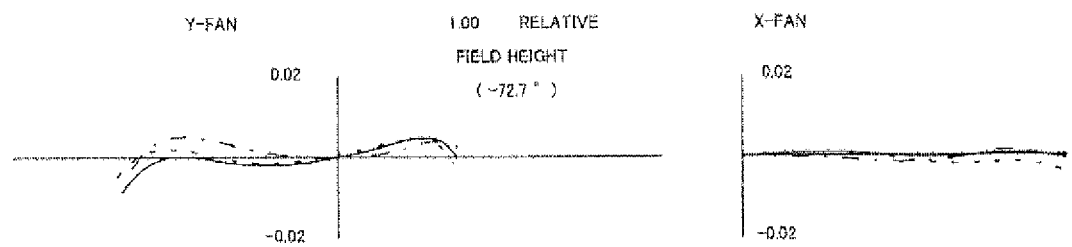
FIGS. 6A to 6E are diagrams showing lateral aberration of the projection optical system, which correspond to FIG. 5A.
Figure 6B:
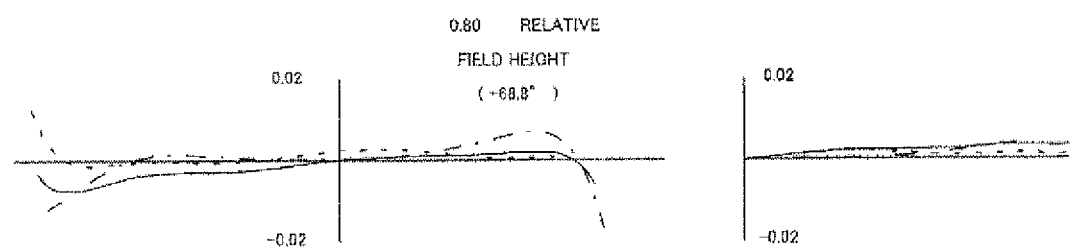
Figure 6C:
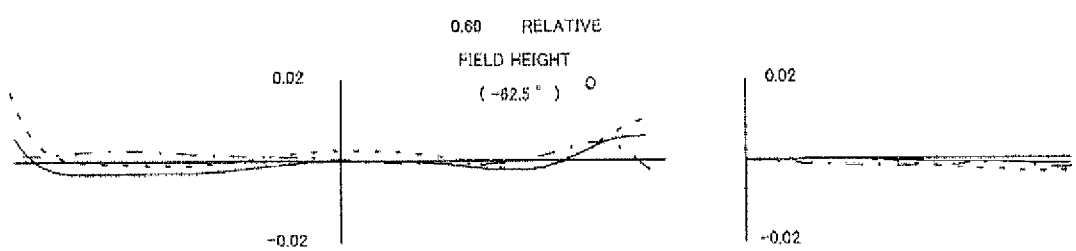
Figure 6D:
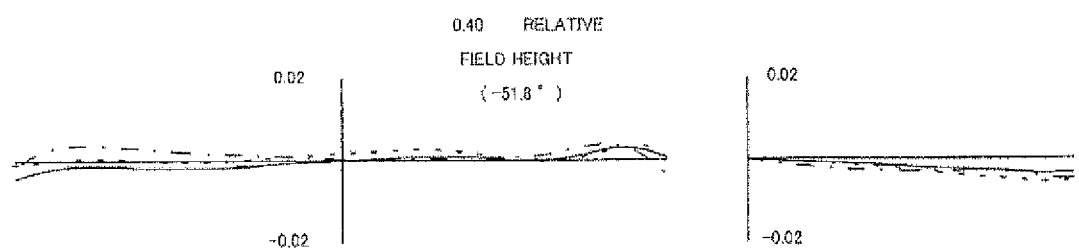
Figure 6E:
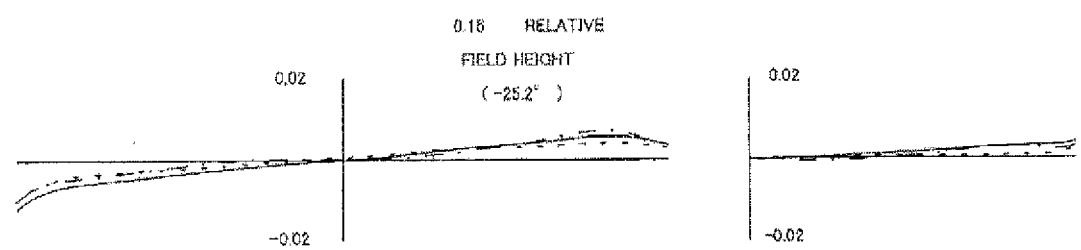
Figure 7A:
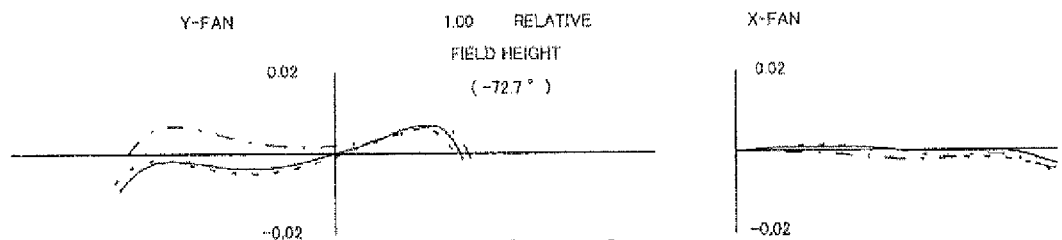
FIGS. 7A to 7E are diagrams showing lateral aberration of the projection optical system, which correspond to FIG. 5B.
Figure 7B:
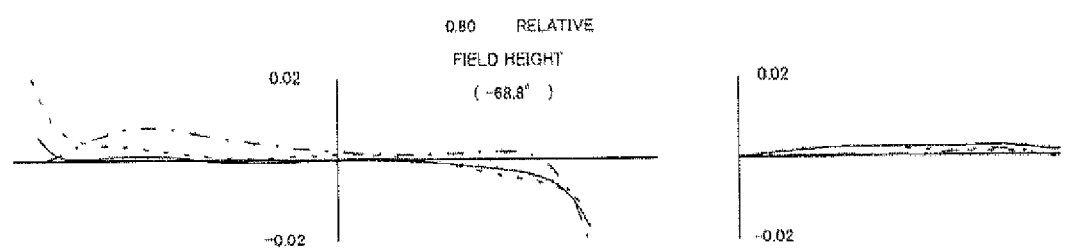
Figure 7C:
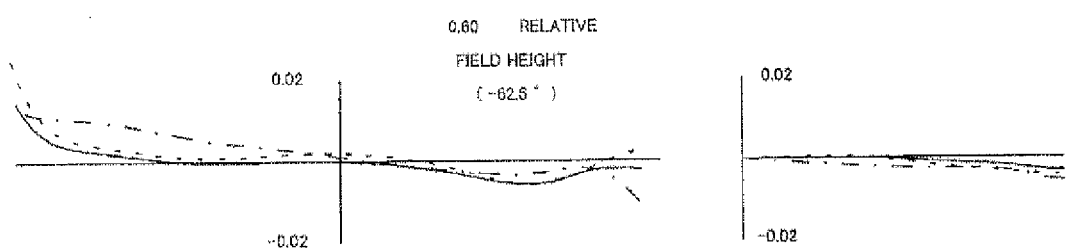
Figure 7D:
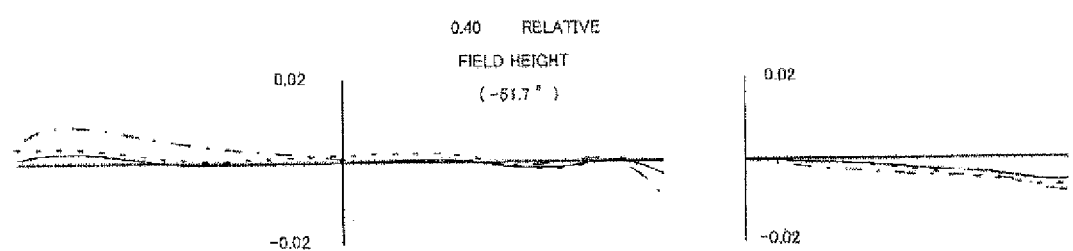
Figure 7E:
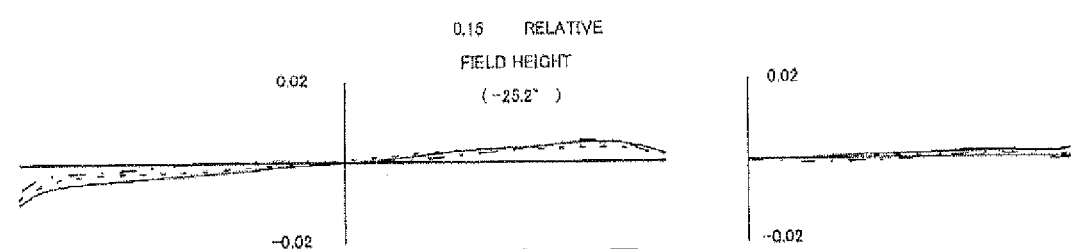
Figure 8A:
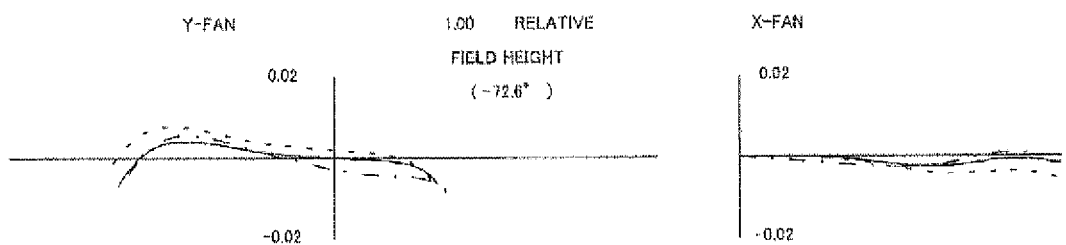
FIGS. 8A to 8E are diagrams showing lateral aberration of the projection optical system, which correspond to FIG. 5C.
Figure 8B:
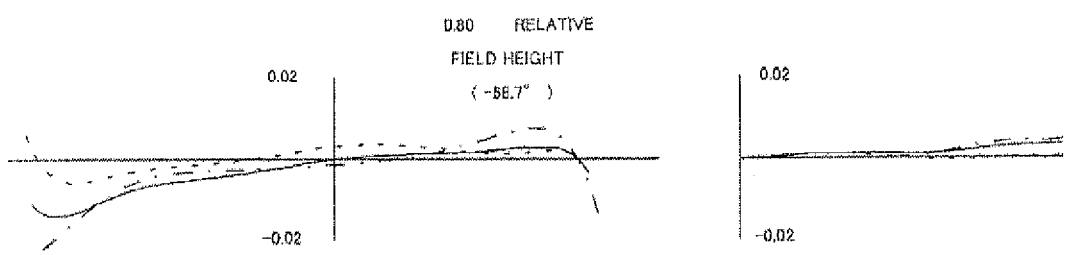
Figure 8C:
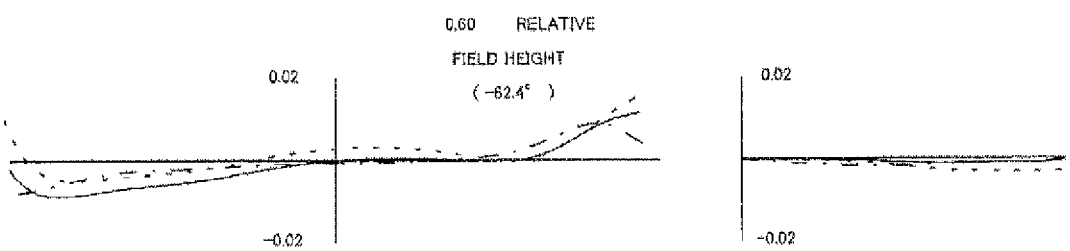
Figure 8D:
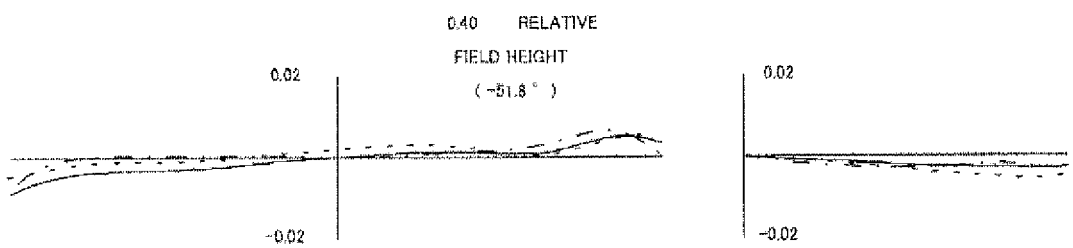
Figure 8E:
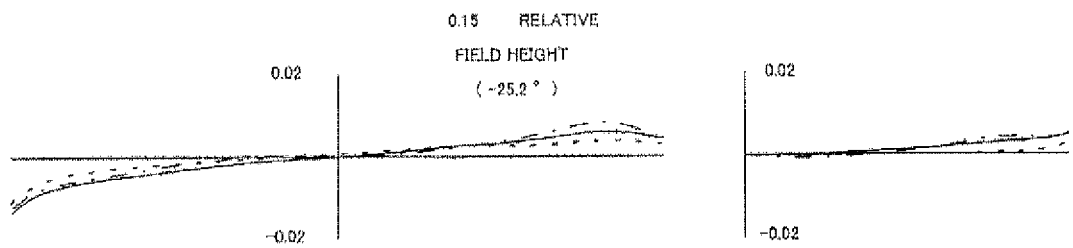

FIG. 5A is a diagram showing aberration (spherical aberration, astigmatism, and distortion) on the reduction side of the projection optical system when the projection magnification of 125 times is performed. FIG. 5B is a diagram showing aberration on the reduction side of the projection optical system when the projection magnification of 100 times is performed. FIG. 5C is a diagram showing aberration on the reduction side of the projection optical system when the projection magnification of 169 times (170 times) is performed. In addition, FIGS. 6A to 6E are diagrams showing lateral aberration of the projection optical system, which correspond to FIG. 5A. FIG. 6A is a diagram showing the lateral aberration in a case of the maximum angle of view and FIGS. 6A to 6E are diagrams showing lateral aberration at five levels of the angle of view. Similarly, FIGS. 7A to 7E are diagrams showing lateral aberration of the projection optical system, which correspond to FIG. 5B. FIGS. 8A to 8E are diagrams showing lateral aberration of the projection optical system, which correspond to FIG. 5C.

Example 2

Data of lens surfaces of Example 2 is shown in Table 4. Further, OBJ means the panel surface PI and STO means the aperture ST. In addition, a surface having "*" after a surface reference number means a surface having aspheric shape.

TABLE 4

| f 3.757 | | | |
|---|---|---|---|
| ω 72.7 | | | |
| NA 0.313 | | | |

| | R | D | Nd | Vd |
|---|---|---|---|---|
| OBJ | Infinity | 9.500 | | |
| 1 | Infinity | 25.970 | 1.51633 | 64.14 |
| 2 | Infinity | 0.000 | | |
| 3 | 34.367 | 9.200 | 1.61800 | 63.33 |
| 4 | −71.540 | 0.200 | | |
| 5 | 29.406 | 8.000 | 1.48749 | 70.24 |

TABLE 4-continued f 3.757
ω 72.7
NA 0.313

| | R | D | Nd | Vd |
|---|---|---|---|---|
| 6 | −66.556 | 1.200 | 1.80518 | 25.42 |
| 7 | 79.741 | 0.200 | | |
| 8 | 20.625 | 10.500 | 1.48749 | 70.24 |
| 9 | −19.048 | 1.200 | 1.90366 | 31.31 |
| 10 | 36.555 | 0.400 | | |
| *11 | 20.515 | 1.400 | 1.58913 | 61.15 |
| *12 | 13.882 | 0.300 | | |
| 13 | 19.471 | 4.000 | 1.48749 | 70.24 |
| 14 | −800.000 | 0.451 | | |
| STO | Infinity | 2.385 | | |
| 16 | 26.460 | 4.600 | 1.84666 | 23.78 |
| 17 | −56.596 | 2.599 | | |
| *18 | −75.346 | 1.800 | 1.74320 | 49.29 |
| *19 | 21.259 | variable interval | | |
| 20 | 267.720 | 2.000 | 1.80518 | 25.42 |
| 21 | 39.846 | 10.800 | 1.62004 | 36.26 |
| 22 | −69.505 | 0.200 | | |
| 23 | 82.085 | 5.800 | 1.64769 | 33.79 |
| 24 | −242.910 | variable interval | | |
| 25 | 56.357 | 10.500 | 1.58144 | 40.75 |
| 26 | −93.383 | 2.000 | 1.80518 | 25.42 |
| 27 | 93.383 | variable interval | | |
| *28 | −311.142 | 2.800 | 1.53116 | 56.04 |
| *29 | 33.733 | variable interval | | |
| *30 | −53.857 | variable interval | reflective surface | |
| 31 | Infinity | | | |

Table 5 shows a aspheric surface coefficient of a lens surface of Example 2.

TABLE 5

Aspheric Surface Coefficient

| | K | A04 | A06 | A08 | A10 | A12 | A14 |
|---|---|---|---|---|---|---|---|
| 11 | −0.2240 | −2.7796E−04 | 1.8104E−06 | −3.7963E−09 | 0.0000E+00 | 0.0000E+00 | 0.0000E+00 |
| 12 | −2.5184 | −1.8785E−04 | 1.7541E−06 | −6.7530E−09 | 1.1439E−11 | 0.0000E+00 | 0.0000E+00 |
| 18 | −1.0000 | −9.0000E−05 | 0.0000E+00 | 0.0000E+00 | 0.0000E+00 | 0.0000E+00 | 0.0000E+00 |
| 19 | 0.2425 | −6.1991E−05 | 1.2108E−07 | −3.1167E−10 | 0.0000E+00 | 0.0000E+00 | 0.0000E+00 |
| 28 | −90.0000 | 1.7601E−06 | −7.2288E−10 | 6.5613E−12 | −1.2369E−14 | 6.6559E−18 | 0.0000E+00 |
| 29 | 0.0000 | −2.1539E−05 | 2.1299E−08 | −2.5888E−11 | 1.8274E−14 | −9.2287E−18 | 1.4615E−21 |
| 30 | −1.0313 | 4.2586E−08 | 5.7313E−11 | −6.5033E−14 | 2.1447E−17 | −3.6118E−21 | 2.4248E−25 |

Table 6 shows values of variable intervals 19, 24, 27, 29, and 30 in Table 5 at the projection magnification of 125 times, the projection magnification of 100 times, and the projection magnification of 169 times.

TABLE 6

Variable Interval

| | 125× | 100× | 169× |
|---|---|---|---|
| 19 | 11.780 | 12.132 | 11.420 |
| 24 | 8.016 | 4.000 | 12.553 |
| 27 | 18.200 | 21.454 | 14.500 |
| 29 | 113.000 | 113.410 | 112.523 |
| 30 | −501.000 | −408.855 | −665.888 |

Figure 9:
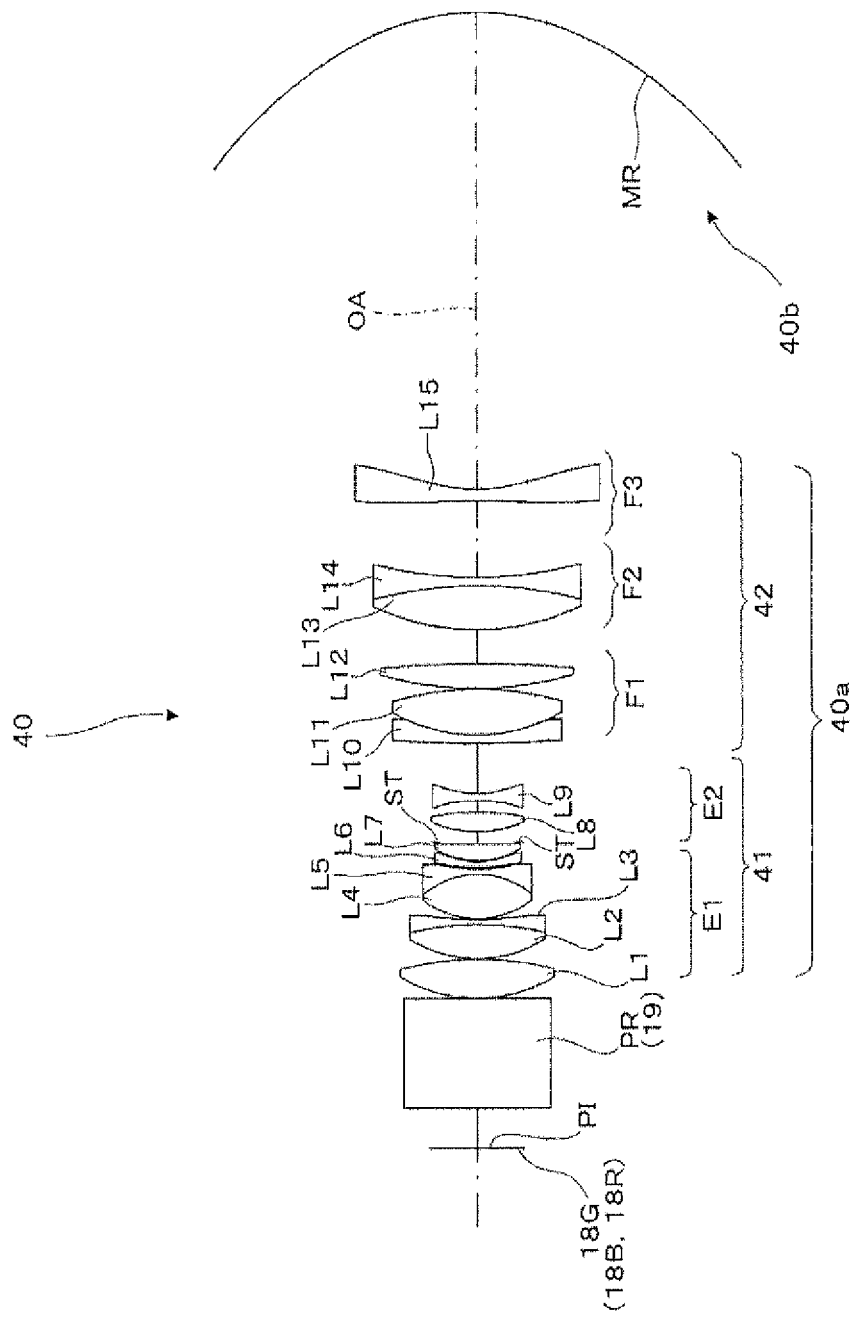
FIG. 9 is a diagram showing a configuration of a projection optical system of Example 2.

FIG. 9 is a sectional diagram showing the projection optical system of Example 2. Further, the lens L15 or the mirror MR having a partially notched shape from a circle in an actual optical system is depicted intact without a notch in FIG. 9. In FIG. 9, the projection optical system performs enlargement projection of an image on the panel surface PI to the screen at a magnification depending on a distance. In other words, the projection optical system has 15 lenses L1 to L15 of the lenses L1 to L7 configuring the lens group E1 of the 1-1st lens group 41, the lenses L8 and L9 configuring the lens group E2 thereof, the lenses L10 to L12 configuring the lens group F1 of 1-2nd lens group 42, the lenses L13 and L14 configuring the lens group F2 thereof, and the lens L15 configuring the lens group F3 thereof, in this order from the reduction side. For example, as in the case where projection onto a wall surface is changed to projection onto a floor surface, the magnification change occurs due to the change of a projection position (change of projection distance), and the 1-1st lens group 41 is fixed as is when focusing is performed during the magnification change, whereas the lens groups F1 to F3 configuring the 1-2nd lens group 42 individually move.

As above, in Example 2, the first optical group 40a is configured to have 15 lenses from the lens L1 (first lens) to the lens L15 (fifteenth lens) numbered from the reduction side, and the first optical group 40a can be divided into the 1-1st lens group 41 which is fixed when focusing is performed during the magnification change, and the 1-2nd lens group 42 which moves when focusing is performed during the magnification change.

More specifically, the 1-1st lens group 41 is configured to include the lens group E1 having the lens L1 formed as a positive lens, the cemented lens of the positive lens L2 and the negative lens L3, the cemented lens of the positive lens L4 and the negative lens L5, the negative lens L6 (negative meniscus lens) having both surfaces subjected to a aspheric surface process with a convex surface facing the reduction side, and the positive lens L7 with a convex surface facing the reduction side, the aperture ST, and the lens group E2 having the lens L8 which is the positive biconvex lens and the biconcave lens L9 having both surfaces subjected to a aspheric surface process, in this order from the reduction side. In other words, a total of nine lenses in lens groups E1 and E2 are sequentially arranged.

The 1-2nd lens group 42 is configured to include the lens group F1 (F1 lens group) having the cemented lens of the negative lens L10, the positive lens L11, and the positive lens L12, the lens group F2 (F2 lens group) having the cemented lens of the positive lens L13 and the negative lens L14, and the lens group F3 (F3 lens group) having the negative lens L15 having both surfaces subjected to a aspheric surface process, from the reduction side, and a total of six lenses in the lens groups F1 to F3 are sequentially disposed. The 1-2nd lens group 42 performs focusing by causing the three lens groups to individually move, when the projection distance is changed and the focusing is performed during the magnification change.

The second optical group 40b is configured of one mirror having a concave aspheric surface.

Figure 10A:
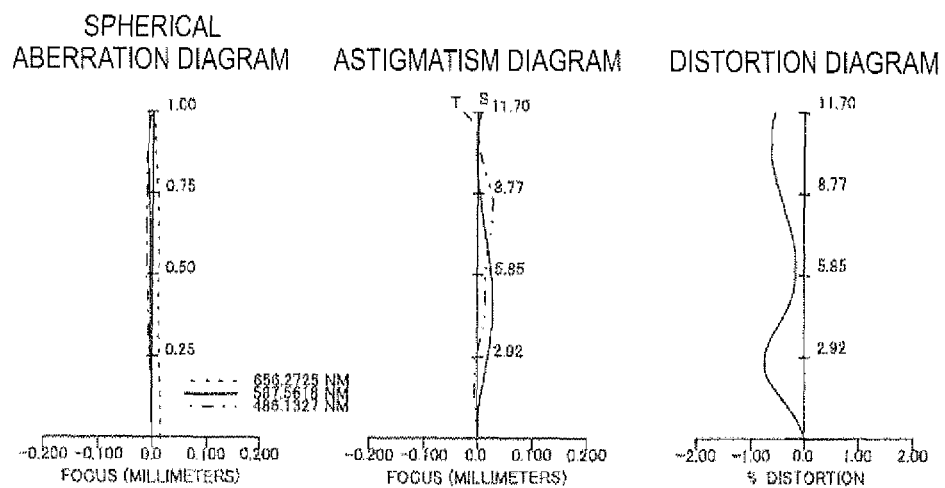
FIGS. 10A to 10C are diagrams showing aberration on a reduction side of the projection optical system of Example 2.
Figure 10B:
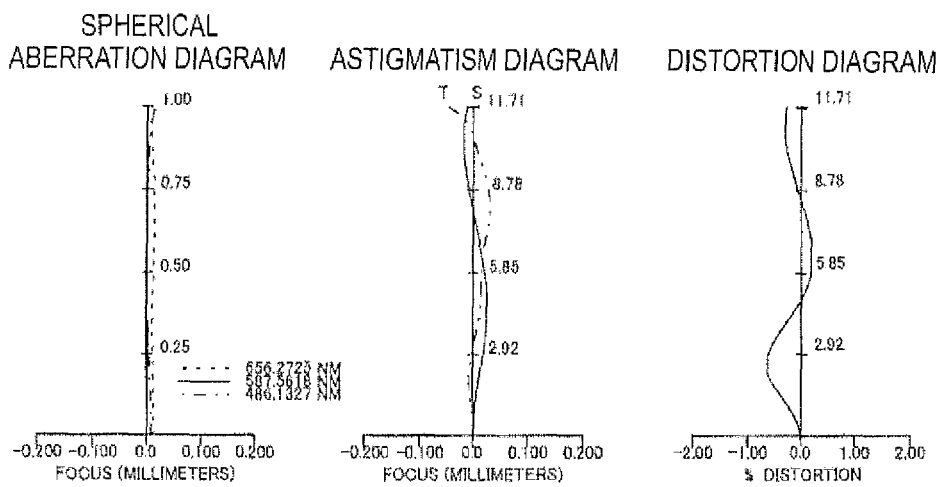
Figure 10C:
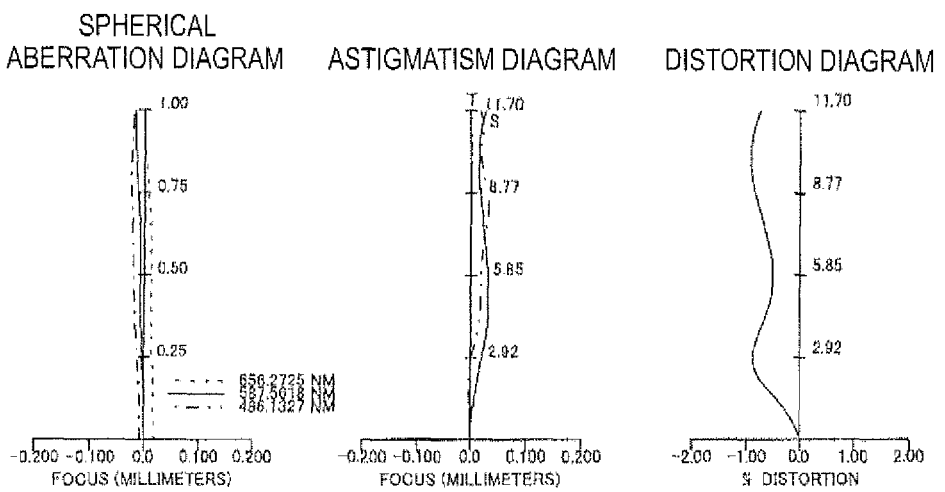
Figure 11A:
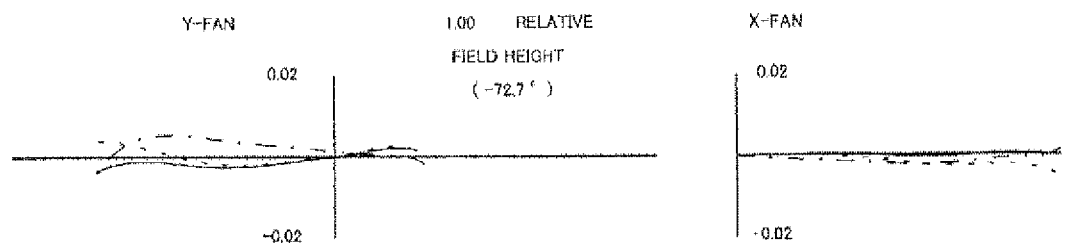
FIGS. 11A to 11E are diagrams showing lateral aberration of the projection optical system, which correspond to FIG. 10A.
Figure 11B:
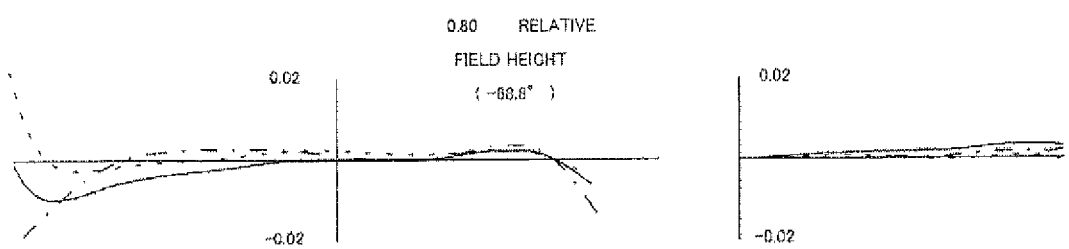
Figure 11C:
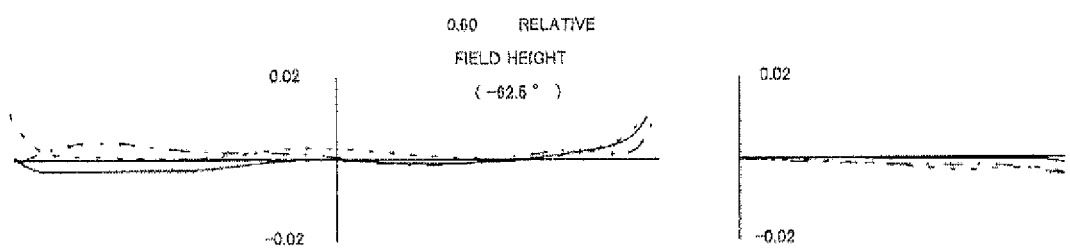
Figure 11D:
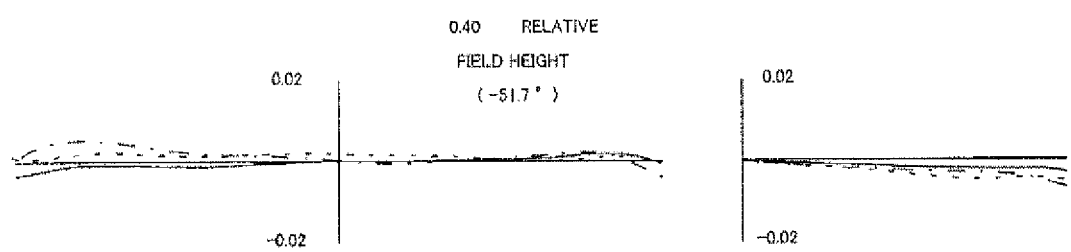
Figure 11E:
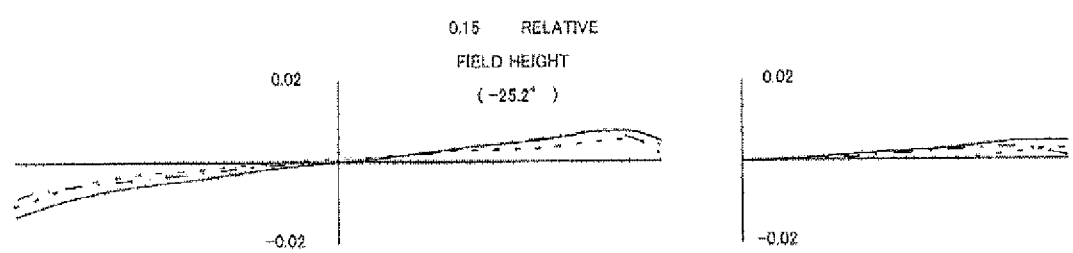
Figure 12A:
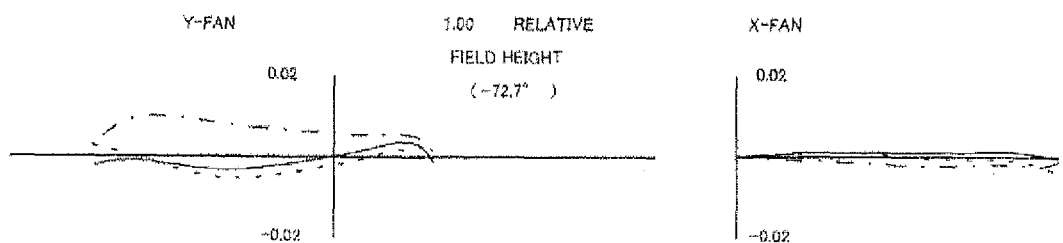
FIGS. 12A to 12E are diagrams showing lateral aberration of the projection optical system, which correspond to FIG. 10B.
Figure 12B:
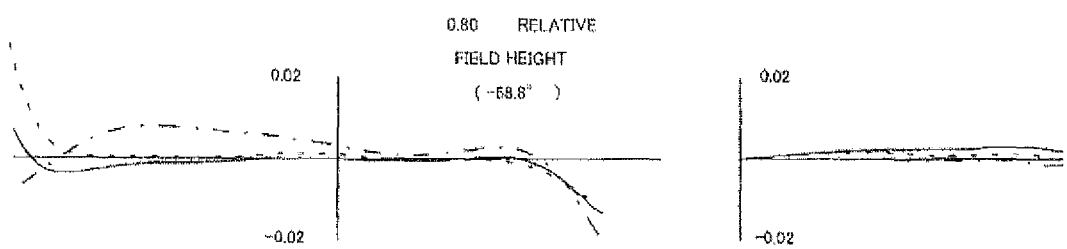
Figure 12C:
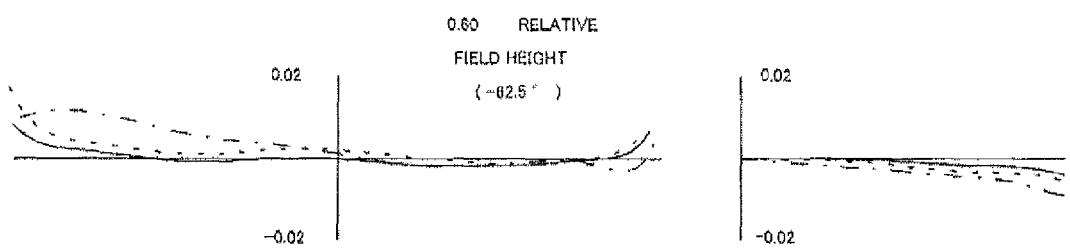
Figure 12D:
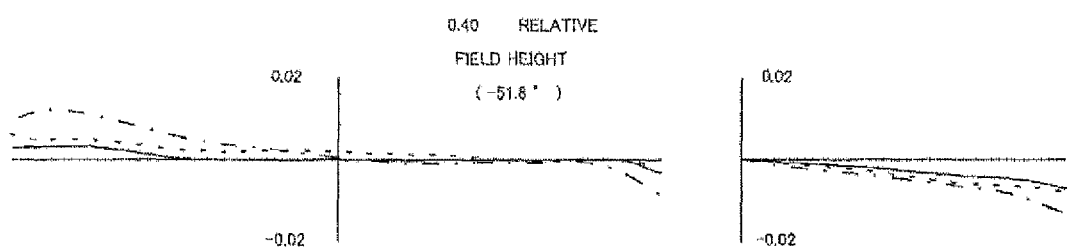
Figure 12E:
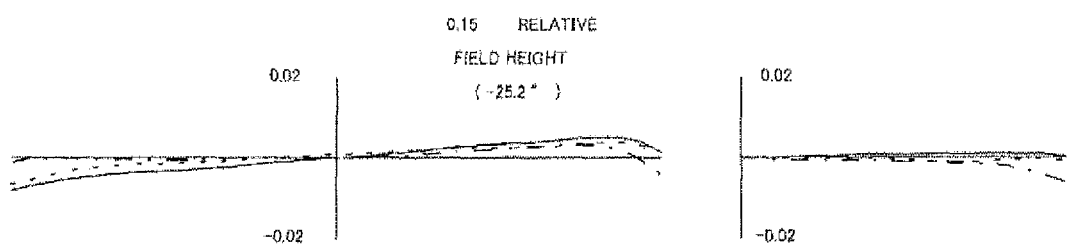
Figure 13A:
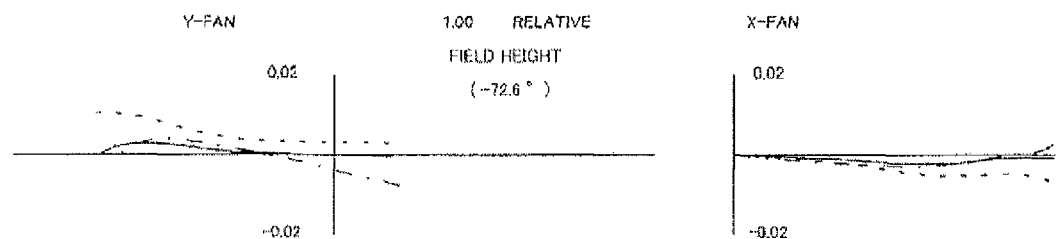
FIGS. 13A to 13E are diagrams showing lateral aberration of the projection optical system, which correspond to FIG. 10C.
Figure 13B:
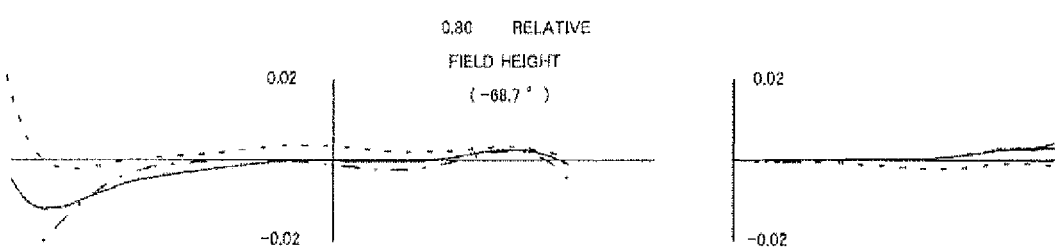
Figure 13C:
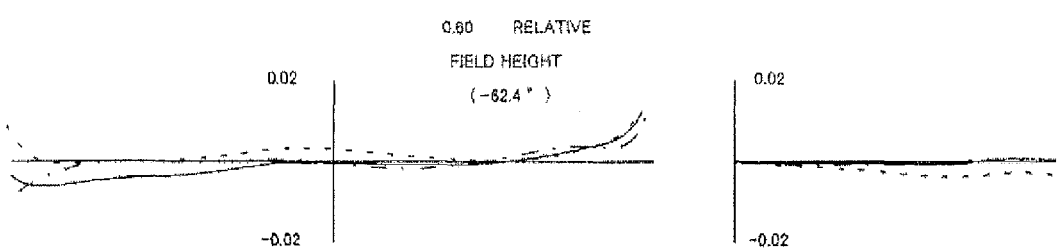
Figure 13D:
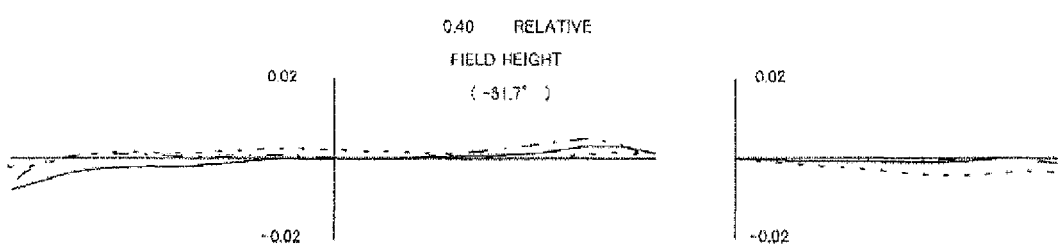
Figure 13E:
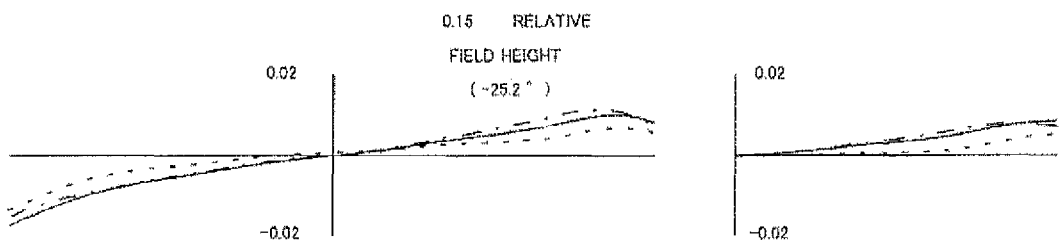

FIG. 10A is a diagram showing aberration (spherical aberration, astigmatism, and distortion) on the reduction side of the projection optical system when the projection magnification of 125 times is performed. FIG. 10B is a diagram showing aberration on the reduction side of the projection optical system when the projection magnification of 100 times is performed. FIG. 10C is a diagram showing aberration on the reduction side of the projection optical system when the projection magnification of 169 times (170 times) is performed. In addition, FIGS. 11A to 11E are diagrams showing lateral aberration of the projection optical system, which correspond to FIG. 10A. FIG. 11A is a diagram showing the lateral aberration in a case of the maximum angle of view and FIGS. 11A to 11E are diagrams showing lateral aberration at five levels of the angle of view. Similarly, FIGS. 12A to 12E are diagrams showing lateral aberration of the projection optical system, which correspond to FIG. 10B. FIGS. 13A to 13E are diagrams showing lateral aberration of the projection optical system, which correspond to FIG. 10C.

Example 3

Data of lens surfaces of Example 3 is shown in Table 7. Further, OBJ means the panel surface PI and STO means the aperture ST. In addition, a surface having "*" after a surface reference number means a surface having aspheric shape.

TABLE 7

| | f 3.753 ω 72.6 NA 0.313 | | | |
|---|---|---|---|---|
| | R | D | Nd | Vd |
| OBJ | Infinity | 9.500 | | |
| 1 | Infinity | 25.970 | 1.51633 | 64.14 |
| 2 | Infinity | 0.000 | | |
| 3 | 30.324 | 9.200 | 1.49700 | 81.54 |
| 4 | −71.284 | 0.200 | | |
| 5 | 26.206 | 8.000 | 1.48749 | 70.24 |
| 6 | −334.183 | 1.200 | 1.80518 | 25.42 |
| 7 | 41.952 | 0.200 | | |
| 8 | 21.564 | 10.500 | 1.51633 | 64.14 |
| 9 | −20.465 | 1.200 | 1.90366 | 31.31 |
| 10 | 107.431 | 0.400 | | |
| *11 | 28.721 | 1.400 | 1.58913 | 61.15 |
| *12 | 17.727 | 0.300 | | |

TABLE 7-continued

| | f 3.753 ω 72.6 NA 0.313 | | | |
|---|---|---|---|---|
| | R | D | Nd | Vd |
| 13 | 16.458 | 4.000 | 1.48749 | 70.24 |
| 14 | 62.093 | 3.825 | | |
| STO | Infinity | 0.100 | | |
| 16 | 24.772 | 4.600 | 1.80518 | 25.42 |
| 17 | −38.760 | 1.800 | 1.72000 | 50.23 |
| 18 | 31.098 | 3.085 | | |
| *19 | −34.966 | 1.000 | 1.80610 | 40.88 |
| *20 | −79.856 | variable interval | | |
| 21 | 415.184 | 4.200 | 1.62004 | 36.26 |
| 22 | −91.821 | 0.200 | | |
| 23 | 115.177 | 5.145 | 1.49700 | 81.54 |
| 24 | −142.461 | variable interval | | |
| 25 | 46.248 | 11.500 | 1.58144 | 40.75 |
| 26 | −81.203 | 2.000 | 1.80518 | 25.42 |
| 27 | 81.203 | variable interval | | |
| *28 | −48.237 | 2.800 | 1.53116 | 56.04 |
| *29 | 56.594 | variable interval | | |
| *30 | −54.610 | variable interval | reflective surface | |
| 31 | Infinity | | | |

Table 8 shows a aspheric surface coefficient of a lens surface of Example 3.

TABLE 8

| | Aspheric Surface Coefficient | | | | | | |
|---|---|---|---|---|---|---|---|
| | K | A04 | A06 | A08 | A10 | A12 | A14 |
| 11 | 3.8417 | −2.9555E−04 | 1.7720E−06 | −5.4969E−09 | 0.0000E+00 | 0.0000E+00 | 0.0000E+00 |
| 12 | −1.2392 | −2.4315E−04 | 2.0834E−06 | −8.7043E−09 | 1.2324E−11 | 0.0000E+00 | 0.0000E+00 |
| 19 | 1.0000 | −6.3421E−05 | −2.8492E−07 | 2.2387E−10 | 0.0000E+00 | 0.0000E+00 | 0.0000E+00 |
| 20 | 0.0000 | −1.4309E−05 | −5.9025E−08 | 1.7127E−09 | 0.0000E+00 | 0.0000E+00 | 0.0000E+00 |
| 28 | −12.8176 | −1.7791E−05 | 3.5018E−08 | −5.8774E−11 | 4.5182E−14 | −1.6494E−17 | 0.0000E+00 |
| 29 | 0.0000 | −2.6459E−05 | 3.8735E−08 | −6.4740E−11 | 6.8251E−14 | −4.3252E−17 | 1.2169E−20 |
| 30 | −0.9784 | 5.6039E−08 | 4.6814E−11 | −5.9371E−14 | 2.0499E−17 | −3.6330E−21 | 2.5799E−25 |

Table 9 shows values of variable intervals 20, 24, 27, 29, and 30 in Table 8 at the projection magnification of 125 times, the projection magnification of 100 times, and the projection magnification of 169 times.

TABLE 9

| | Variable Interval | | |
|---|---|---|---|
| | 125× | 100× | 169× |
| 20 | 19.369 | 19.836 | 19.135 |
| 24 | 6.220 | 4.000 | 8.423 |
| 27 | 16.086 | 17.633 | 14.500 |
| 29 | 114.000 | 114.205 | 113.617 |
| 30 | −501.000 | −410.608 | −666.363 |

Figure 14:
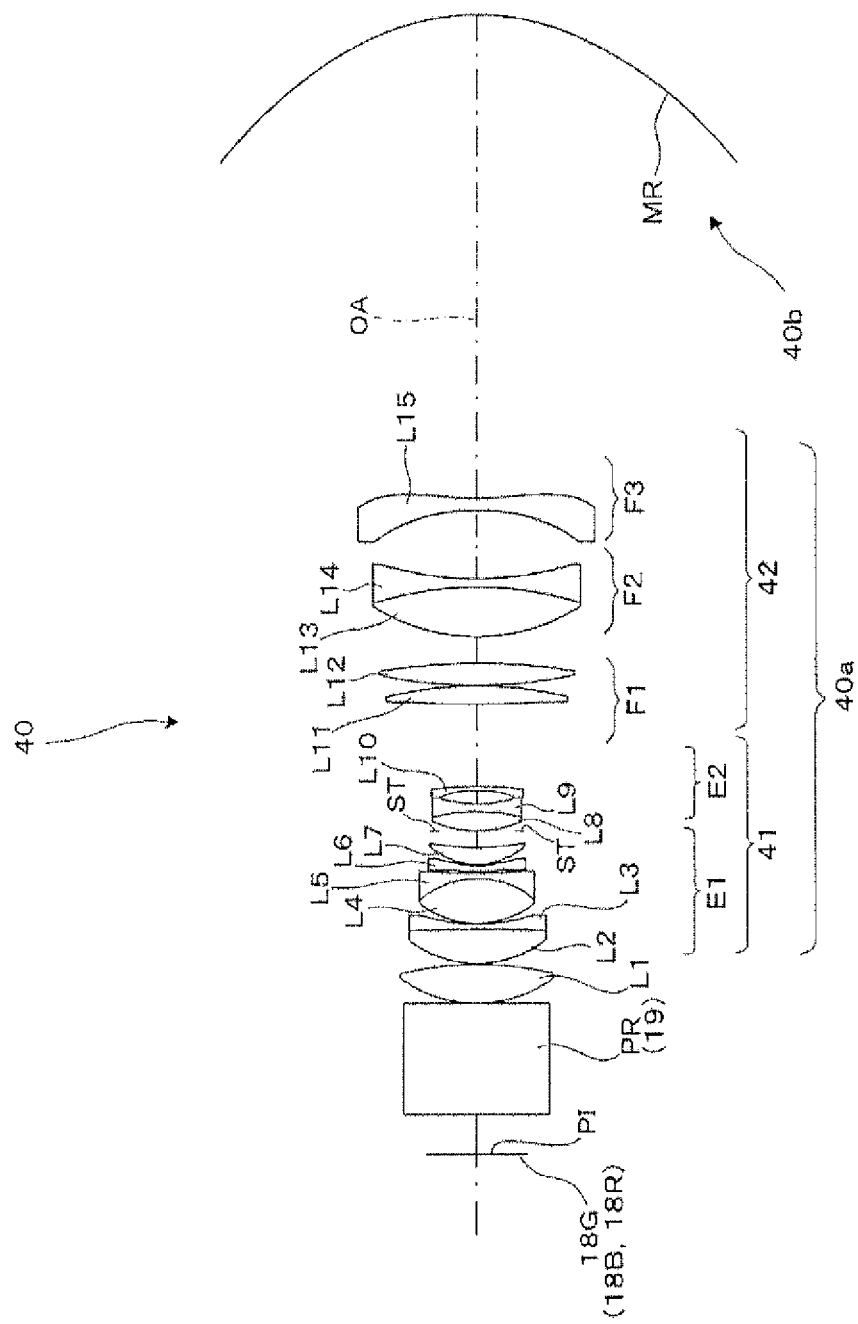
FIG. 14 is a diagram showing a configuration of a projection optical system of Example 3.

FIG. 14 is a sectional diagram showing the projection optical system of Example 3. Further, the lens L15 or the mirror MR having a partially notched shape from a circle in an actual optical system is depicted intact without a notch in FIG. 14. In FIG. 14, the projection optical system performs enlargement projection of an image on the panel surface PI to the screen at a magnification depending on a distance. In other words, the projection optical system has 15 lenses L1 to L15 of the lenses L1 to L7 configuring the lens group E1 of 1-1st lens group 41, the lenses L8 to L10 configuring the lens group E2 thereof, the lenses L11 and L12 configuring the lens group F1 of 1-2nd lens group 42, the lenses L13 and L14 configuring the lens group F2 thereof, and the lens L15 configuring the lens group F3 thereof, in this order from the reduction side. For example, as in the case where projection onto a wall surface is changed to projection onto a floor surface, the magnification change occurs due to the change of a projection position (change of projection distance), and the 1-1st lens group 41 is fixed as is when focusing is performed during the magnification change, whereas the lens groups F1 to F3 configuring the 1-2nd lens group 42 individually move.

As above, in Example 3, the first optical group 40a is configured to have 15 lenses from the lens L1 (first lens) to the lens L15 (fifteenth lens) numbered from the reduction side, and the first optical group 40a can be divided into the 1-1st lens group 41 which is fixed when focusing is performed during the magnification change, and the 1-2nd lens group 42 which moves when focusing is performed during the magnification change.

More specifically, the 1-1st lens group 41 is configured to include the lens group E1 having the lens L1 formed as a positive lens, the cemented lens of the positive lens L2 and the negative lens L3, the cemented lens of the positive lens L4 and the negative lens L5, the negative lens L6 (negative meniscus lens) having both surfaces subjected to a aspheric surface process with a convex surface facing the reduction side, and the positive lens L7 with a convex surface facing the reduction side, the aperture ST, and the lens group E2 which has the cemented lens of the positive lens L8 and the negative lens L9, and the lens L10 as the negative meniscus lens having both surfaces subjected to a aspheric surface process with a convex surface facing the enlargement side, in this order from the reduction side. In other words, a total of ten lenses in lens groups E1 and E2 are sequentially arranged.

The 1-2nd lens group 42 is configured to include the lens group F1 (F1 lens group) having the cemented lens of the positive lens L11 and the positive lens L12, the lens group F2 (F2 lens group) having the cemented lens of the positive lens L13 and the negative lens L14, and the lens group F3 (F3 lens group) having the negative lens L15 having both surfaces subjected to a aspheric surface process, from the reduction side, and a total of five lenses in the lens groups F1 to F3 are sequentially disposed. The 1-2nd lens group 42 performs focusing by causing the three lens groups to individually move, when the projection distance is changed and the focusing is performed during the magnification change.

The second optical group 40b is configured of one mirror having a concave aspheric surface.

Figure 15A:
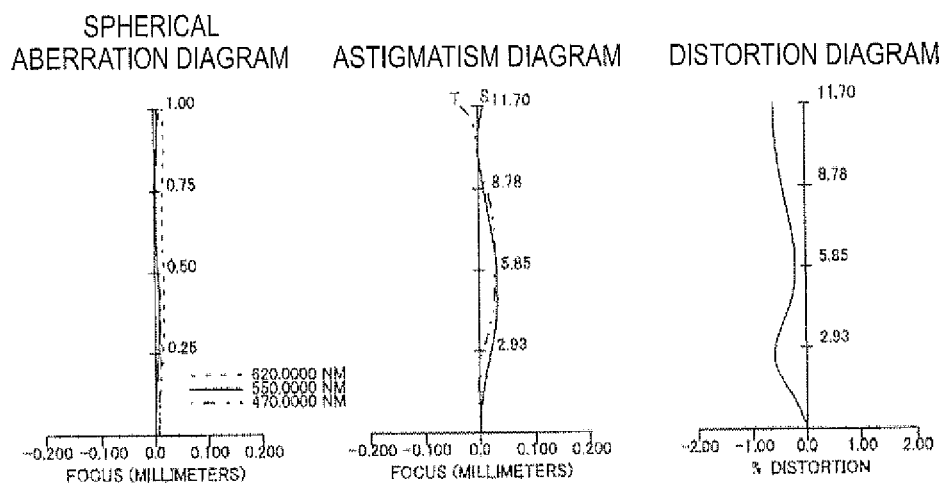
FIGS. 15A to 15C are diagrams showing aberration on a reduction side of the projection optical system of Example 3.
Figure 15B:
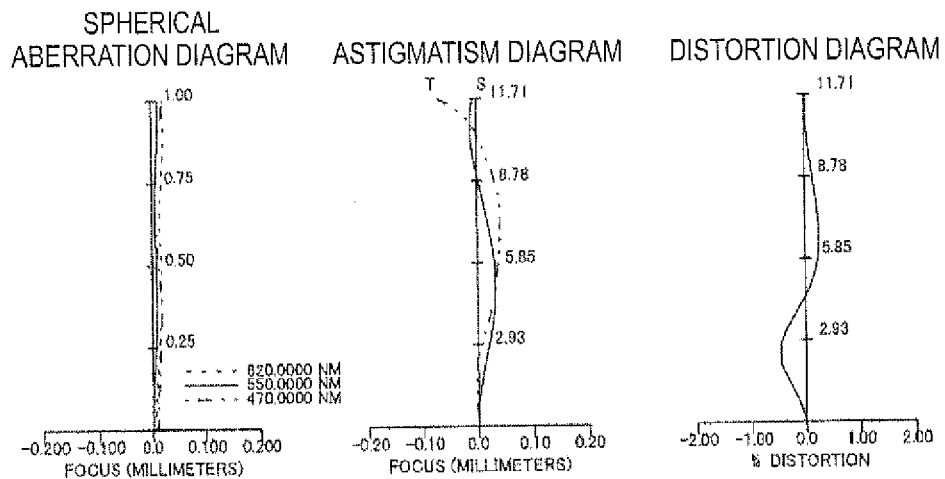
Figure 15C:
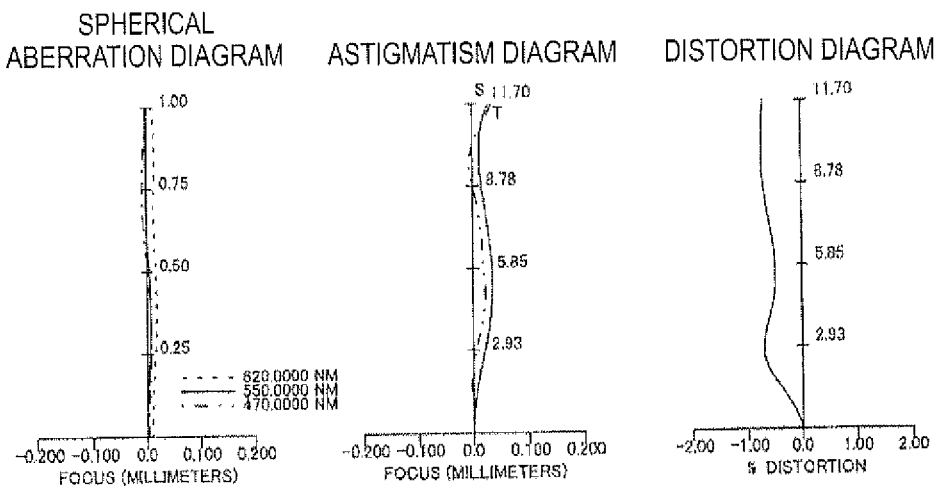

FIG. 15A is a diagram showing aberration (spherical aberration, astigmatism, and distortion) on the reduction side of the projection optical system when the projection magnification of 125 times is performed. FIG. 15B is a diagram showing aberration on the reduction side of the projection optical system when the projection magnification of 100 times is performed. FIG. 15C is a diagram showing aberration on the reduction side of the projection optical system when the projection magnification of 169 times (170 times) is performed.

Figure 16A:
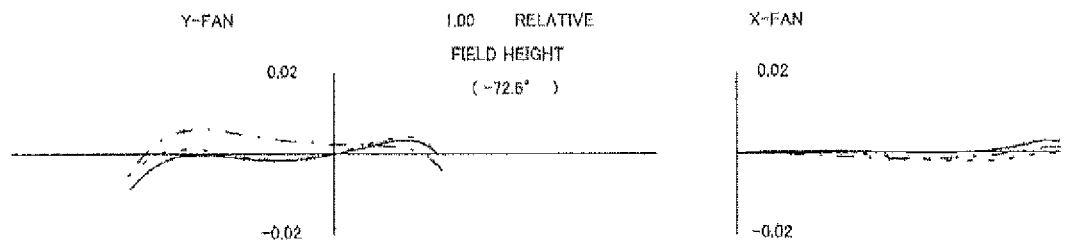
FIGS. 16A to 16E are diagrams showing lateral aberration of the projection optical system, which correspond to FIG. 15A.
Figure 16B:
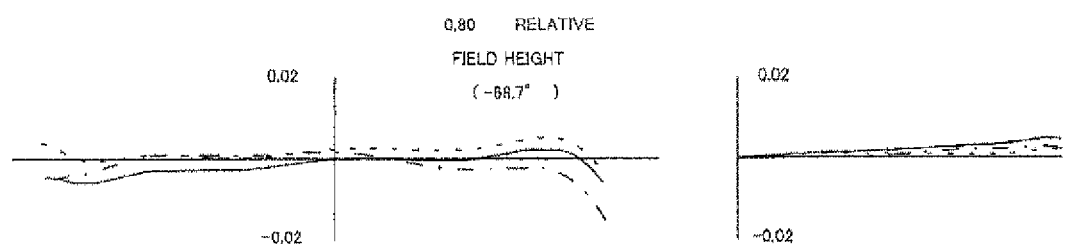
Figure 16C:
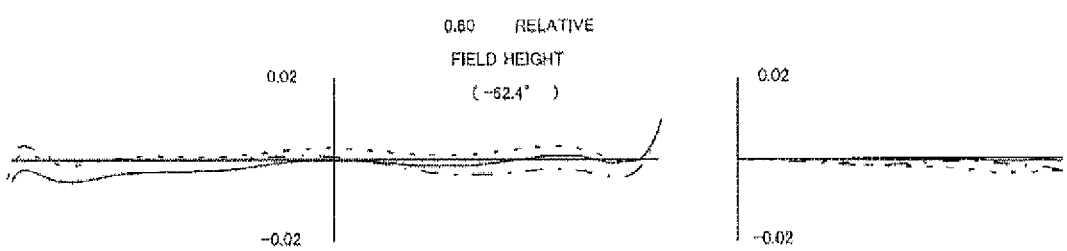
Figure 16D:
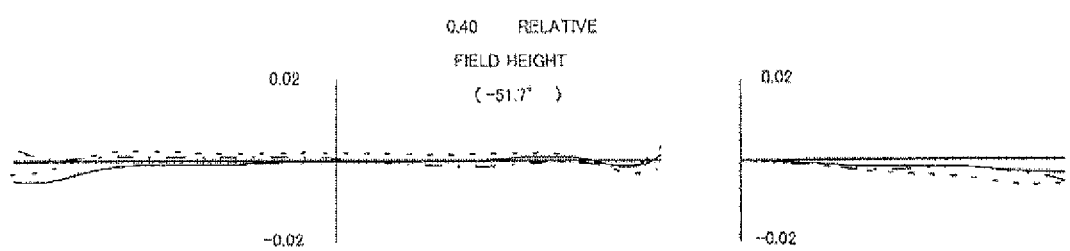
Figure 16E:
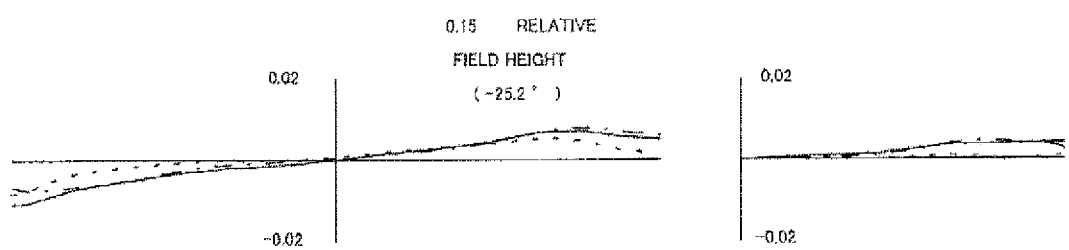
Figure 17A:
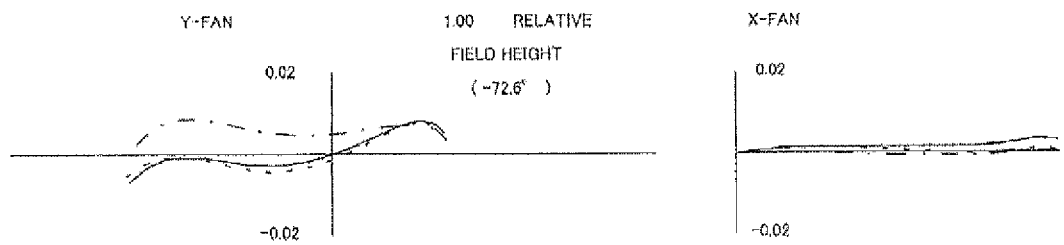
FIGS. 17A to 17E are diagrams showing lateral aberration of the projection optical system, which correspond to FIG. 15B.
Figure 17B:
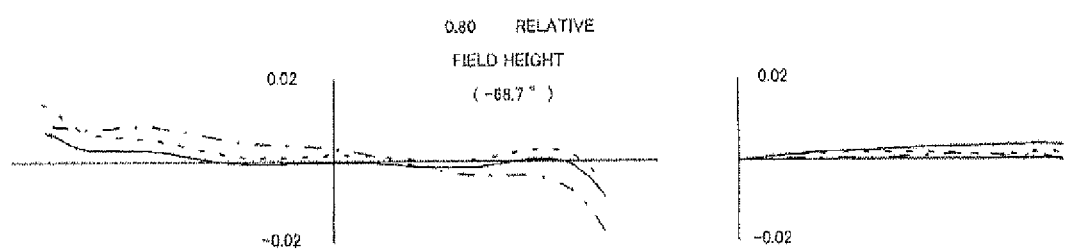
Figure 17C:
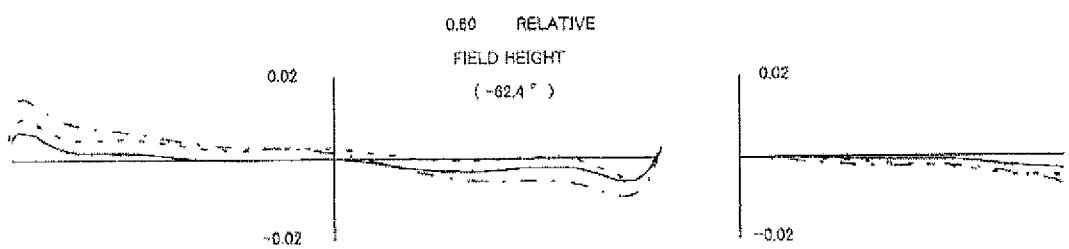
Figure 17D:
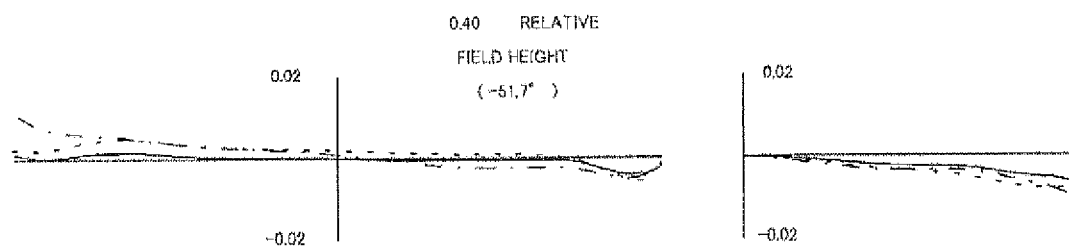
Figure 17E:
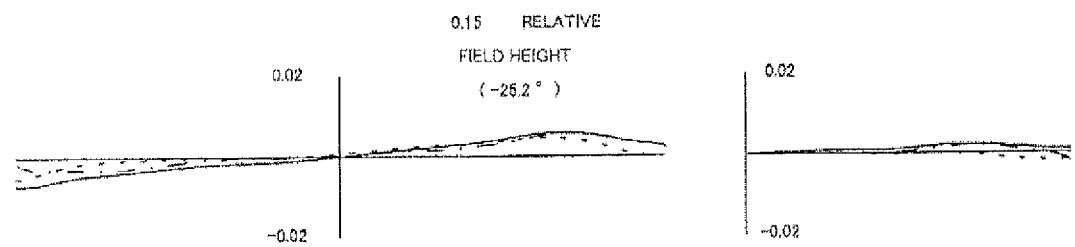
Figure 18A:
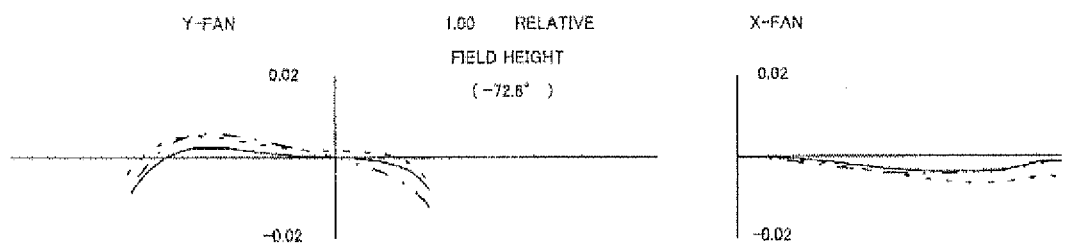
FIGS. 18A to 18E are diagrams showing lateral aberration of the projection optical system, which correspond to FIG. 15C.
Figure 18B:
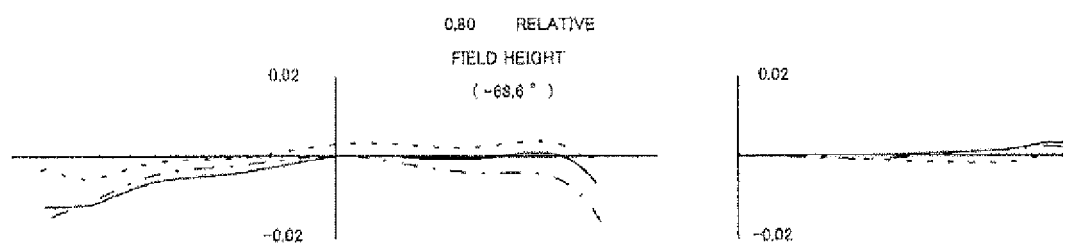
Figure 18C:
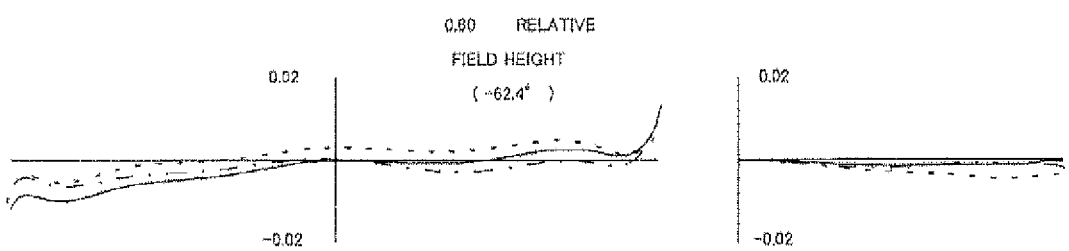
Figure 18D:
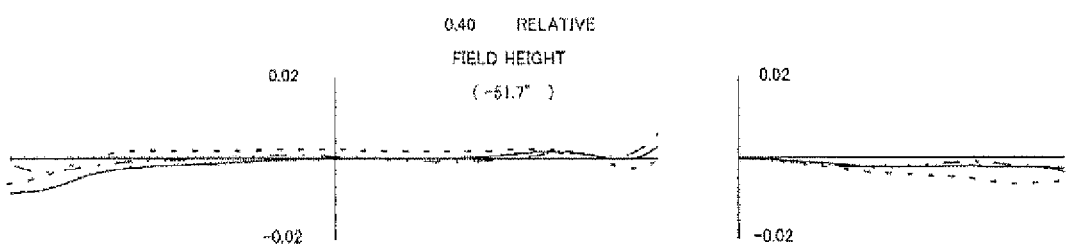
Figure 18E:
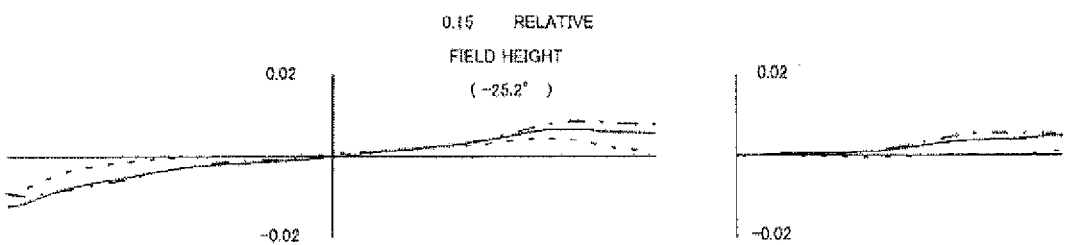

In addition, FIGS. 16A to 16E are diagrams showing lateral aberration of the projection optical system, which correspond to FIG. 15A. FIG. 16A is a diagram showing the lateral aberration in a case of the maximum angle of view and FIGS. 16A to 16E are diagrams showing lateral aberration at five levels of the angle of view. Similarly, FIGS. 17A to 17E are diagrams showing lateral aberration of the projection optical system, which correspond to FIG. 15B. FIGS. 18A to 18E are diagrams showing lateral aberration of the projection optical system, which correspond to FIG. 15C.

Example 4

Data of lens surfaces of Example 4 is shown in Table 10. Further, OBJ means the panel surface PI and STO means the aperture ST. In addition, a surface having "*" after a surface reference number means a surface having aspheric shape.

TABLE 10 f 3.757
ω 72.7
NA 0.313

| | R | D | Nd | Vd |
|---|---|---|---|---|
| OBJ | Infinity | 9.500 | | |
| 1 | Infinity | 25.910 | 1.51633 | 64.14 |
| 2 | Infinity | 0.000 | | |
| 3 | 28.940 | 9.600 | 1.49700 | 81.54 |
| 4 | −72.351 | 0.200 | | |
| 5 | 28.008 | 7.600 | 1.49700 | 81.54 |
| 6 | −80.728 | 1.200 | 1.80518 | 25.42 |
| 7 | 84.182 | 0.200 | | |
| 8 | 23.162 | 10.500 | 1.51633 | 64.14 |
| 9 | −18.390 | 1.200 | 1.90366 | 31.31 |
| 10 | 49.861 | 0.200 | | |
| *11 | 22.232 | 1.400 | 1.58913 | 61.15 |
| *12 | 14.512 | 0.500 | | |
| 13 | 18.701 | 4.000 | 1.48749 | 70.24 |
| 14 | 85.780 | 2.500 | | |
| STO | Infinity | 2.657 | | |
| 16 | 26.255 | 4.200 | 1.84666 | 23.78 |
| 17 | −72.326 | 2.805 | | |
| *18 | −285.961 | 1.800 | 1.74320 | 49.29 |
| *19 | 20.094 | variable interval | | |
| 20 | 294.948 | 3.800 | 1.76182 | 26.52 |
| 21 | −185.552 | 0.200 | | |
| 22 | 88.771 | 11.700 | 1.65412 | 39.68 |
| 23 | −32.587 | 2.000 | 1.80518 | 25.42 |
| 24 | −207.713 | variable interval | | |
| 25 | 47.462 | 11.000 | 1.58144 | 40.75 |
| 26 | −286.510 | 1.907 | | |
| 27 | −162.790 | 2.000 | 1.80518 | 25.42 |
| 28 | 86.542 | variable interval | | |
| *29 | 278.000 | 2.800 | 1.53116 | 56.04 |
| *30 | 32.790 | variable interval | | |
| *31 | −53.401 | variable interval | reflective surface | |
| 32 | Infinity | | | |

Table 11 shows a aspheric surface coefficient of a lens surface of Example 4.

TABLE 11

| | Aspheric Surface Coefficient | | | | | |
|---|---|---|---|---|---|---|
| K | A04 | A06 | A08 | A10 | A12 | A14 |
| 11 1.8918 | −3.2189E−04 | 1.7484E−06 | −4.3348E−09 | 0.0000E+00 | 0.0000E+00 | 0.0000E+00 |
| 12 −1.7155 | −2.4569E−04 | 2.0775E−06 | −8.0954E−09 | 1.6529E−11 | 0.0000E+00 | 0.0000E+00 |
| 18 −1.0000 | −9.0000E−05 | 0.0000E+00 | 0.0000E+00 | 0.0000E+00 | 0.0000E+00 | 0.0000E+00 |
| 19 −0.5794 | −5.2934E−05 | 1.0377E−07 | −1.8067E−10 | 0.0000E+00 | 0.0000E+00 | 0.0000E+00 |
| 29 90.0000 | −6.9308E−06 | 2.1311E−08 | −4.1442E−11 | 3.8427E−14 | −1.6720E−17 | 0.0000E+00 |
| 30 0.0000 | −2.8334E−05 | 3.9541E−08 | −6.2687E−11 | 5.5340E−14 | −2.6577E−17 | 2.7658E−21 |
| 31 −0.9858 | 1.1080E−07 | 3.6232E−11 | −6.1654E−14 | 2.2886E−17 | −4.2330E−21 | 3.0644E−25 |

Table 12 shows values of variable intervals 19, 24, 27, 28, 30, and 31 in Table 11 at the projection magnification of 125 times, the projection magnification of 100 times, and the projection magnification of 169 times.

TABLE 12

| | Variable Interval | | |
|---|---|---|---|
| | 125× | 100× | 169× |
| 19 | 14.163 | 15.223 | 13.108 |
| 24 | 7.258 | 4.000 | 11.119 |
| 28 | 13.838 | 15.762 | 11.500 |
| 30 | 112.362 | 112.637 | 111.895 |
| 31 | −501.000 | −412.661 | −661.960 |

Figure 19:
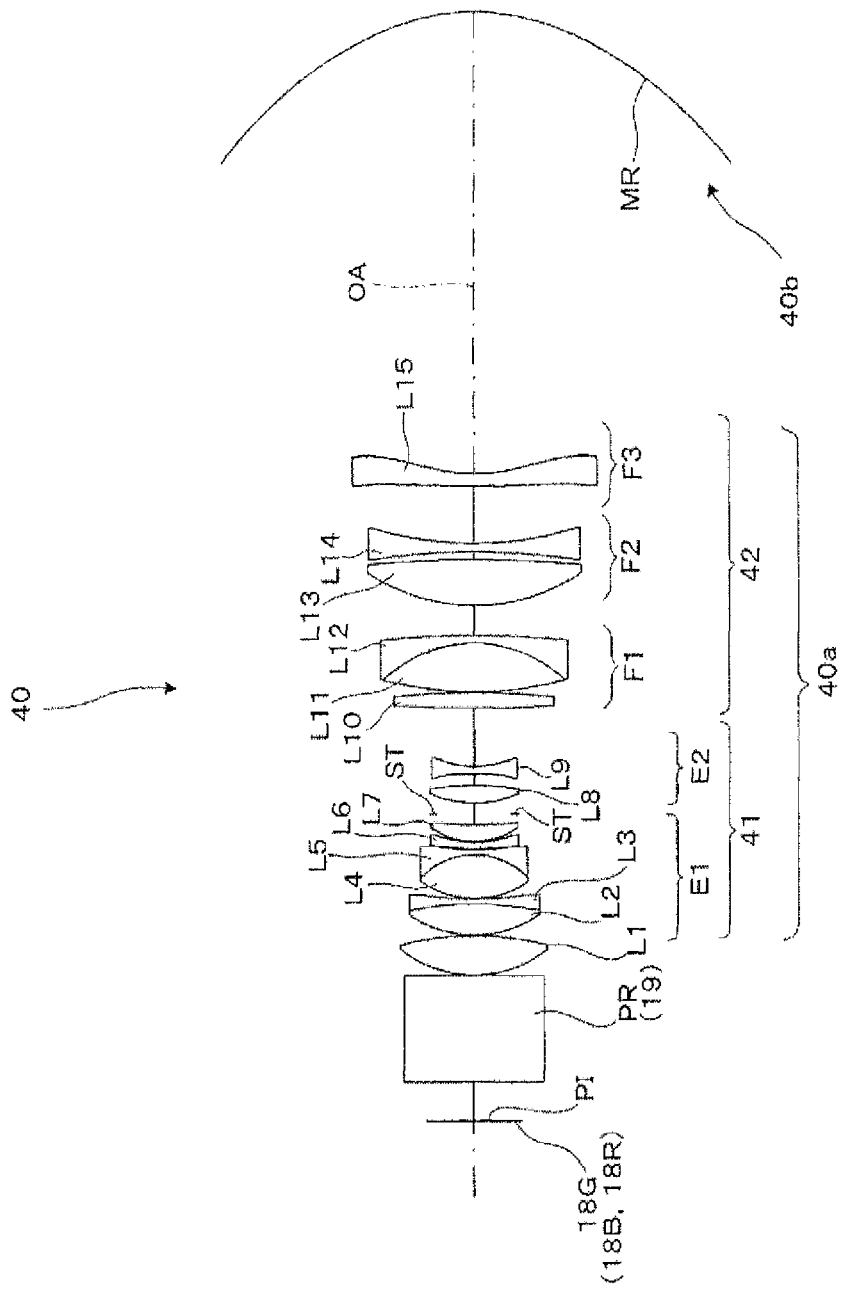
FIG. 19 is a diagram showing a configuration of a projection optical system of Example 4.

FIG. 19 is a sectional diagram showing the projection optical system of Example 4. Further, the lens L15 or the mirror MR having a partially notched shape from a circle in an actual optical system is depicted intact without a notch in FIG. 19. In FIG. 19, the projection optical system performs enlargement projection of an image on the panel surface PI to the screen at a magnification depending on a distance. In other words, the projection optical system has 15 lenses L1 to L15 of the lenses L1 to L7 configuring the lens group E1 of 1-1st lens group 41, the lenses L8 and L9 configuring the lens group E2 thereof, the lenses L10 to L12 configuring the lens group F1 of 1-2nd lens group 42, the lenses L13 and L14 configuring the lens group F2 thereof, and the lens L15 configuring the lens group F3 thereof, in this order from the reduction side. For example, as in the case where projection onto a wall surface is changed to projection onto a floor surface, the magnification change occurs due to the change of a projection position (change of projection distance), and the 1-1st lens group 41 is fixed as is when focusing is performed during the magnification change, whereas the lens groups F1 to F3 configuring the 1-2nd lens group 42 individually move.

As above, in Example 4, the first optical group 40a is configured to have 15 lenses from the lens L1 (first lens) to the lens L15 (fifteenth lens) numbered from the reduction side, and the first optical group 40a can be divided into the 1-1st lens group 41 which is fixed when focusing is performed during the magnification change, and the 1-2nd lens group 42 which moves when focusing is performed during the magnification change.

More specifically, the 1-1st lens group 41 is configured to include the lens group E1 having the lens L1 formed as a positive lens, the cemented lens of the positive lens L2 and the negative lens L3, the cemented lens of the positive lens L4 and the negative lens L5, the negative lens L6 (negative meniscus lens) having both surfaces subjected to a aspheric surface process with a convex surface facing the reduction side, and the positive lens L7 with a convex surface facing the reduction side, the aperture ST, and the lens group E2 which has the positive lens L8 and the negative lens L9, in this order from the reduction side. In other words, a total of nine lenses in lens groups E1 and E2 are sequentially arranged.

The 1-2nd lens group 42 is configured to include the lens group F1 (F1 lens group) having the positive lens L10, the cemented lens of the negative lens L11 and the positive lens L12, the lens group F2 (F2 lens group) having the positive lens L13 and the negative lens L14, and the lens group F3 (F3 lens group) having the negative lens L15 having both surfaces subjected to a aspheric surface process, from the reduction side, and a total of six lenses in the lens groups F1 to F3 are sequentially disposed. The 1-2nd lens group 42 performs focusing by causing the three lens groups to individually move, when the projection distance is changed and the focusing is performed during the magnification change.

The second optical group 40b is configured of one mirror having a concave aspheric surface.

Figure 20A:
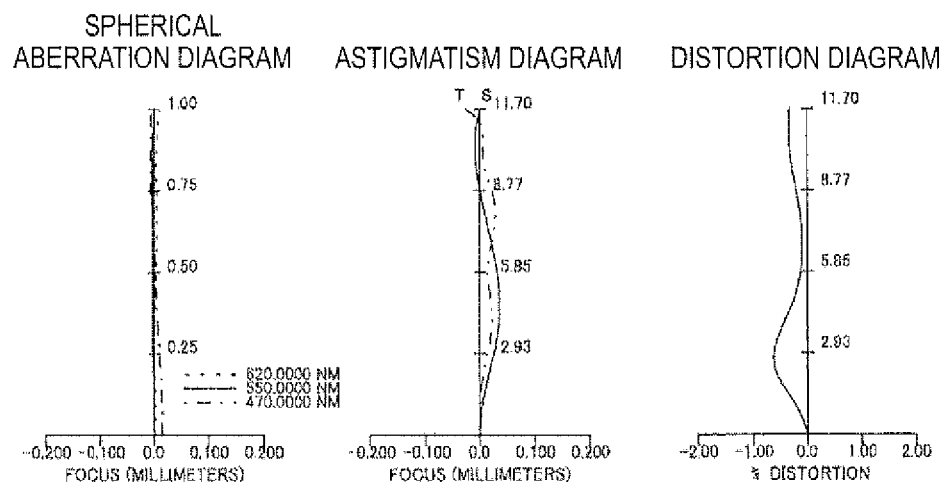
FIGS. 20A to 20C are diagrams showing aberration on a reduction side of the projection optical system of Example 4.
Figure 20B:
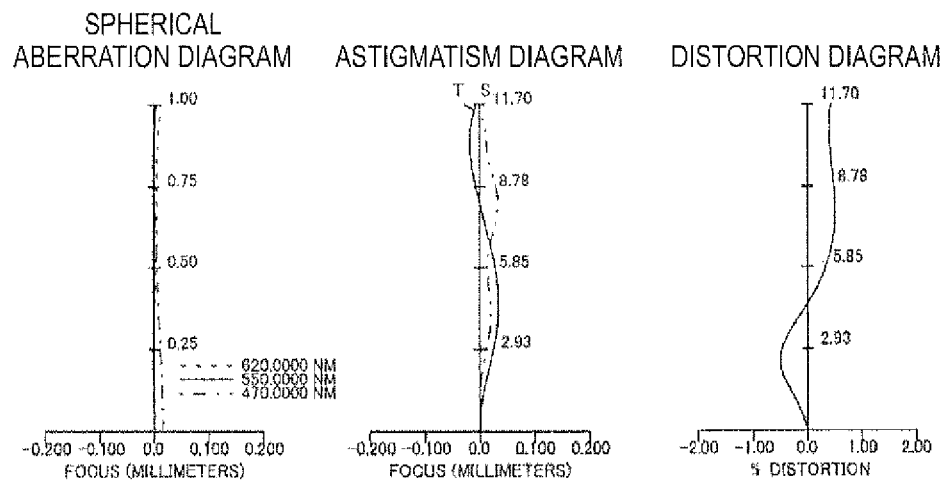
Figure 20C:
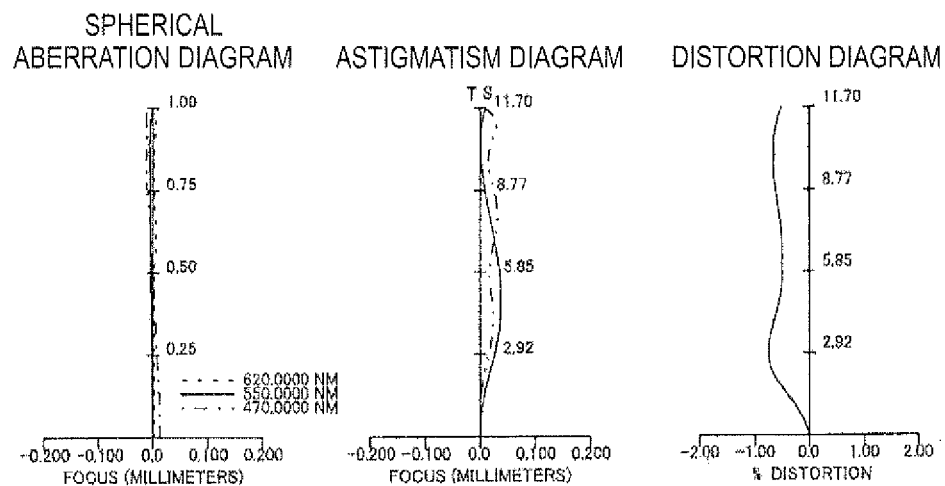

FIG. 20A is a diagram showing aberration (spherical aberration, astigmatism, and distortion) on the reduction side of the projection optical system when the projection magnification of 125 times is performed. FIG. 20B is a diagram showing aberration on the reduction side of the projection optical system when the projection magnification of 100 times is performed. FIG. 20C is a diagram showing aberration on the reduction side of the projection optical system when the projection magnification of 169 times (170 times) is performed.

Figure 21A:
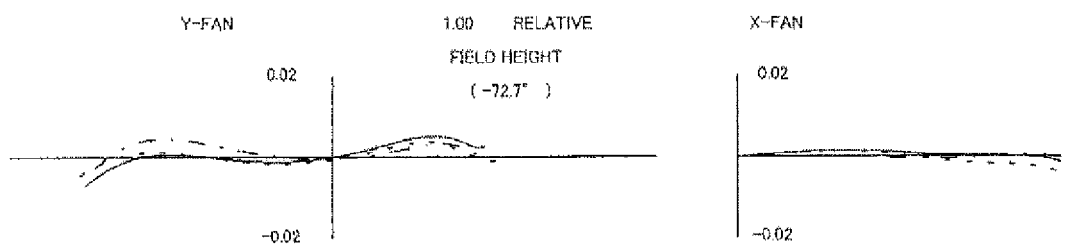
FIGS. 21A to 21E are diagrams showing lateral aberration of the projection optical system, which correspond to FIG. 20A.
Figure 21B:
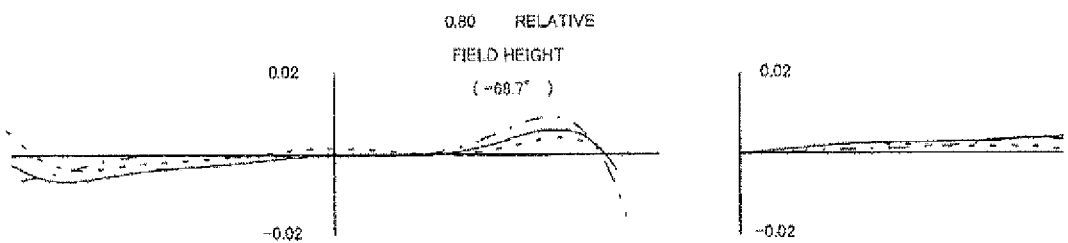
Figure 21C:
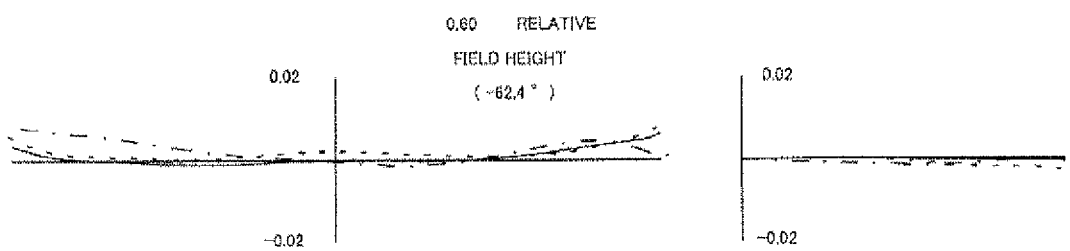
Figure 21D:
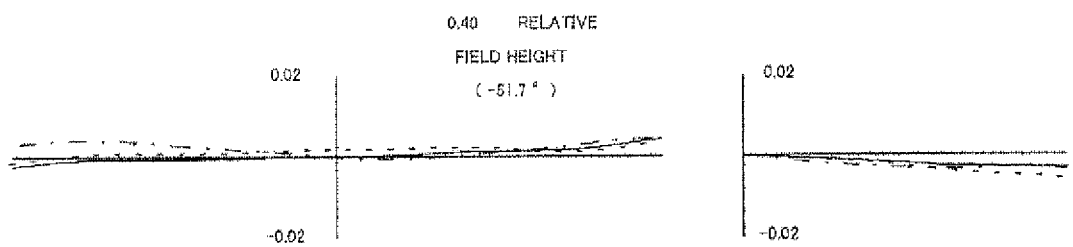
Figure 21E:
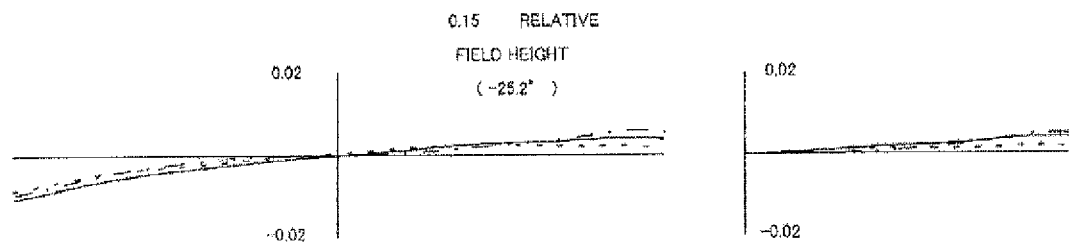
Figure 22A:
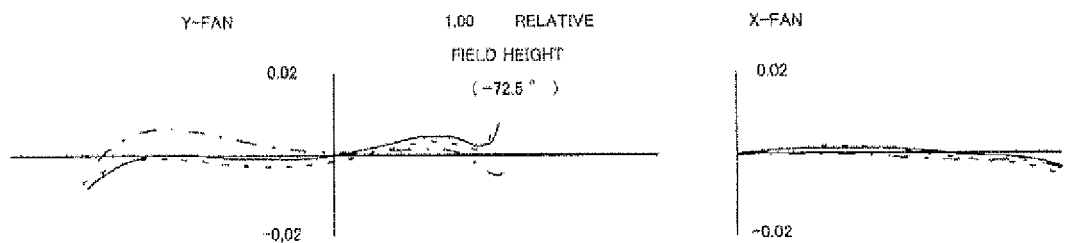
FIGS. 22A to 22E are diagrams showing lateral aberration of the projection optical system, which correspond to FIG. 20B.
Figure 22B:
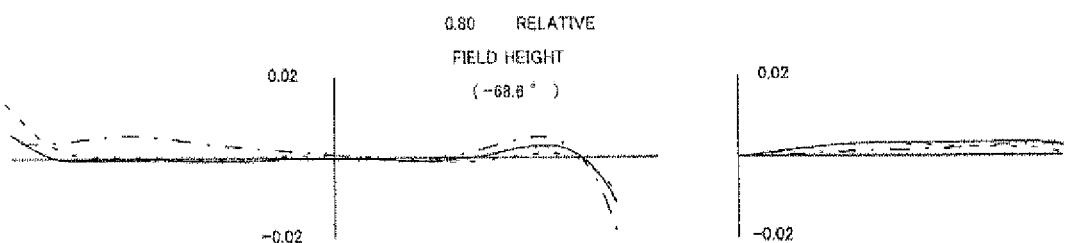
Figure 22C:
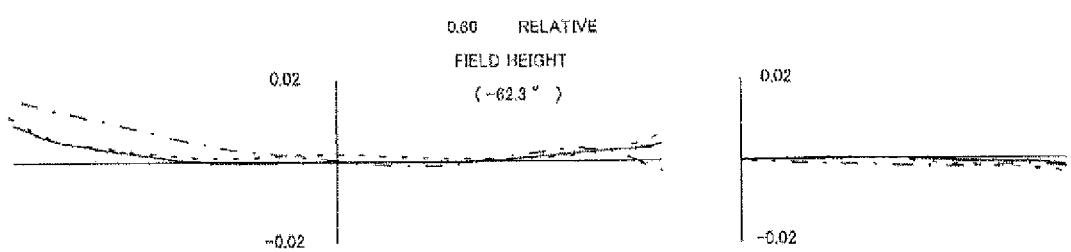
Figure 22D:
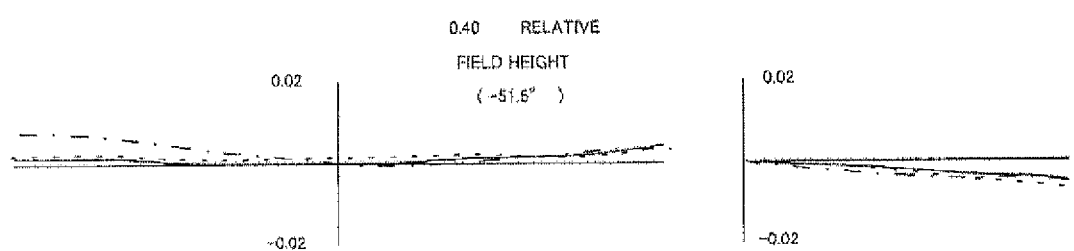
Figure 22E:
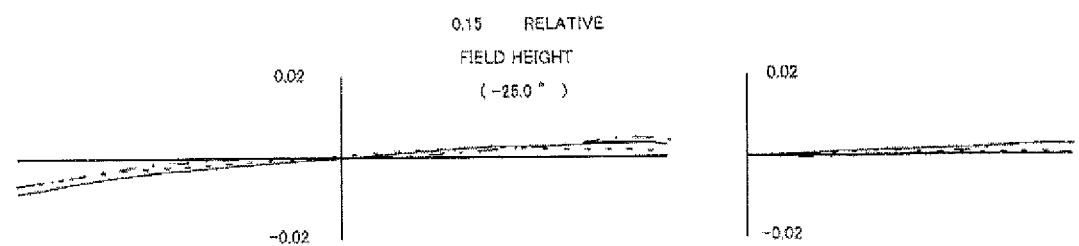
Figure 23A:
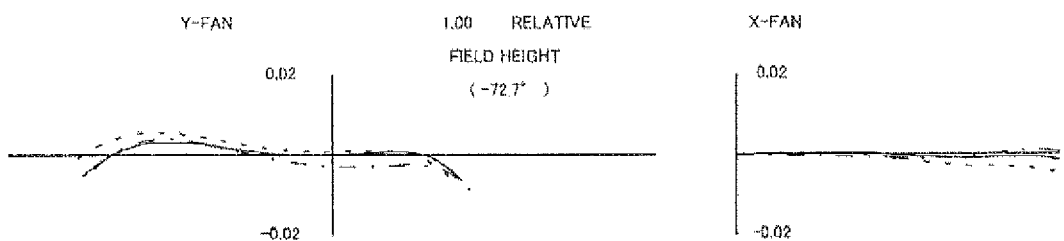
FIGS. 23A to 23E are diagrams showing lateral aberration of the projection optical system, which correspond to FIG. 20C.
Figure 23B:
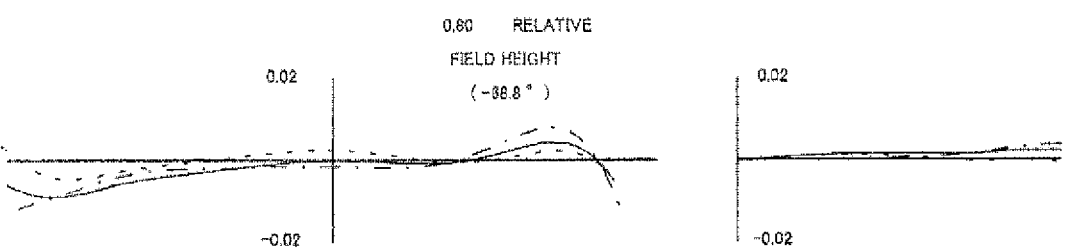
Figure 23C:
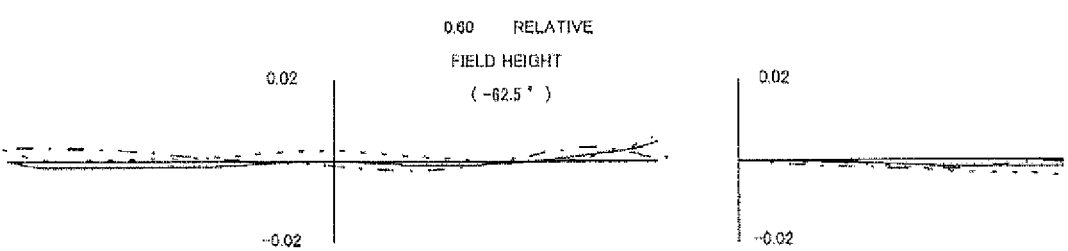
Figure 23D:
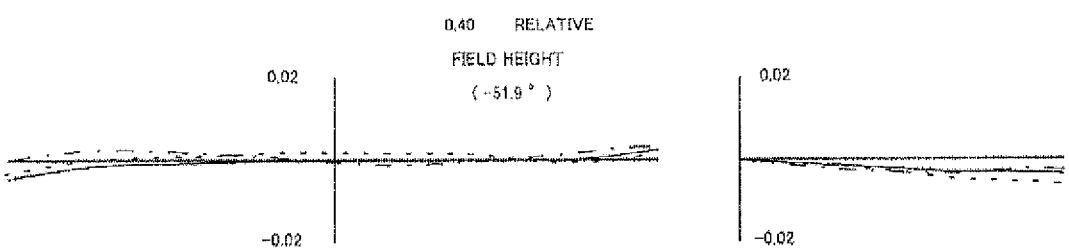
Figure 23E:
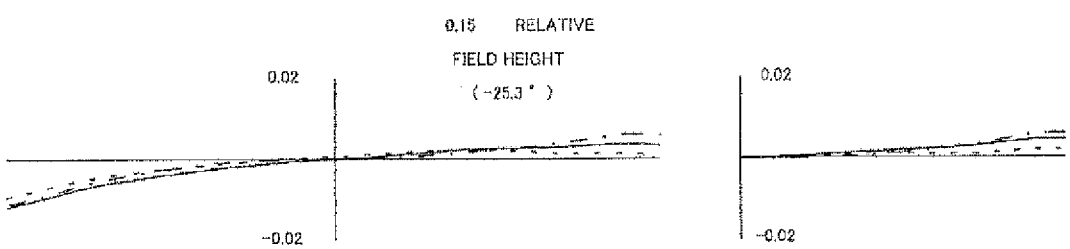

In addition, FIGS. 21A to 21E are diagrams showing lateral aberration of the projection optical system, which correspond to FIG. 20A. FIG. 21A is a diagram showing the lateral aberration in a case of the maximum angle of view and FIGS. 21A to 21E are diagrams showing lateral aberration at five levels of the angle of view. Similarly, FIGS. 22A to 22E are diagrams showing lateral aberration of the projection optical system, which correspond to FIG. 20B. FIGS. 23A to 23E are diagrams showing lateral aberration of the projection optical system, which correspond to FIG. 20C.

SUMMARY OF EXAMPLES

In any one of Examples, a simple configuration, in which the lens group F3 (F3 lens group) is one aspheric resin lens, is employed while a wide angle of view is equal to or greater than a half angle of view of 70° at a wide angle end.

The invention is not limited to the embodiments or examples described above and can be performed in various aspects within a range without departing from the gist thereof.

For example, in order to lower the image height to be projected, the F2 lens group formed of the cemented lens may have the non-circular shape, in addition to the lens L15 (F3 lens group) as the aspheric lens.

In addition, in the respective Examples, one or more lenses having substantially no power may be added before and after or between the lenses configuring each lens group.

In addition, a target of enlargement projection by the projection optical system 40 is not limited to the liquid crystal panels 18G, 18R, and 18B, but it is possible for the projection optical system 40 to perform enlargement projection of an image formed by various light flux modulating elements such as a digital micromirror device, in which a micromirror functions as a pixel.

The entire disclosure of Japanese Patent Application No. 2015-013031, filed Jan. 27, 2015 is expressly incorporated by reference herein.

What is claimed is:

1. A projection optical system comprising:
in order from a reduction side,
a first optical group which is formed of a plurality of lenses and has positive power; and
a second optical group which has one reflective surface having a concave aspheric shape,
wherein the first optical group is formed to include a 1-1st lens group which is fixed when focusing is performed during the magnification change and has positive power, and a 1-2nd lens group which moves when focusing is performed during the magnification change, is formed of a plurality of lenses, and has positive power as a whole, and
wherein the 1-2nd lens group is a lens group which individually moves when focusing is performed during the magnification change, and includes three lens groups of a positive F1 lens group formed of at least two lenses, F2 lens group formed of only two lenses, and F3 lens group formed of one negative lens.

2. The projection optical system according to claim 1, wherein the F3 lens group of the three lens groups configuring the 1-2nd lens group includes one aspheric lens formed of a resin.

3. The projection optical system according to claim 1, wherein the F2 lens group of the three lens groups configuring the 1-2nd lens group includes a biconvex lens and a biconcave lens in this order from the reduction side.

4. The projection optical system according to claim 3, wherein the biconvex lens and the biconcave lens of the F2 lens group form a cemented lens.

5. The projection optical system according to claim 1, wherein, in the 1-2nd lens group, the F1 lens group is configured of at least two positive lenses, the F2 lens group is configured of two lenses of a biconvex lens and a biconcave lens in this order from the reduction side, and the F3 lens group is configured of a resin lens having negative power and having both surfaces being aspheric surfaces.

6. The projection optical system according to claim 1, wherein the 1-1st lens group has an aperture therein, a positive lens, and at least a negative lens disposed on the enlargement side from the aperture in this order from the reduction side, of which the negative lens has at least one surface being an aspheric shape.

7. The projection optical system according to claim 1, wherein the 1-1st lens group includes an aperture therein, at least two sets of cemented lenses of positive lenses and negative lenses disposed on the reduction side from the aperture, and a negative lens having at least one surface being an aspheric shape.

8. The projection optical system according to claim 7, wherein the negative lens is disposed on the reduction side from the aperture disposed in the 1-1st lens group, is a negative meniscus lens and has at least an aspheric surface on a concave surface side.

9. The projection optical system according to claim 1, wherein a numerical aperture on an object side is equal to or more than 0.3.

10. The projection optical system according to claim 1, wherein the reduction side is substantially telecentric.

11. The projection optical system according to claim 1, wherein elements configuring the first optical group and the second optical group all have a rotationally symmetric system.

12. The projection optical system according to claim 1, wherein a range of magnification change is equal to or greater than 1.5 times.

13. The projection optical system according to claim 1, wherein the first optical group forms an intermediate image before the one reflective surface of the second optical group.

14. A projection optical system comprising:
in order from a reduction side,
a first optical group which is formed of a plurality of lenses and has positive power; and
a second optical group which has one reflective surface having a concave aspheric shape,
wherein the first optical group is formed to include a 1-1st lens group which is fixed when focusing is performed during the magnification change and has positive power, and a 1-2nd lens group which moves when focusing is performed during the magnification change, is formed of a plurality of lenses, and has positive power as a whole,
wherein the 1-1st lens group has an aperture therein, a positive lens, and at least a negative lens disposed on the enlargement side from the aperture in this order from the reduction side, of which the negative lens has at least one surface being an aspheric shape, and
wherein the 1-2nd lens group is a lens group which individually moves when focusing is performed during the magnification change, and includes three lens groups of a positive F1 lens group formed of at least two lenses, F2 lens group formed of two lenses, and F3 lens group formed of one negative lens.

15. A projection optical system comprising:
in order from a reduction side,
a first optical group which is formed of a plurality of lenses and has positive power; and
a second optical group which has one reflective surface having a concave aspheric shape,
wherein the first optical group is formed to include a 1-1st lens group which is fixed when focusing is performed during the magnification change and has positive power, and a 1-2nd lens group which moves when focusing is performed during the magnification change, is formed of a plurality of lenses, and has positive power as a whole,
wherein the 1-1st lens group includes an aperture therein, at least two sets of cemented lenses of positive lenses and negative lenses disposed on the reduction side from the aperture, and a negative lens having at least one surface being an aspheric shape, and
wherein the 1-2nd lens group is a lens group which individually moves when focusing is performed during the magnification change, and includes three lens groups of a positive F1 lens group formed of at least two lenses, F2 lens group formed of two lenses, and F3 lens group formed of one negative lens.

16. The projection optical system according to claim 15, wherein the negative lens is disposed on the reduction side from the aperture disposed in the 1-1st lens group, is a negative meniscus lens and has at least an aspheric surface on a concave surface side.

17. A projection optical system comprising:
in order from a reduction side,
a first optical group which is formed of a plurality of lenses and has positive power; and
a second optical group which has one reflective surface having a concave aspheric shape,
wherein the first optical group is formed to include a 1-1st lens group which is fixed when focusing is performed during the magnification change and has positive power, and a 1-2nd lens group which moves when focusing is performed during the magnification change, is formed of a plurality of lenses, and has positive power as a whole,
wherein the 1-2nd lens group is a lens group which individually moves when focusing is performed during the magnification change, and includes three lens groups of a positive F1 lens group formed of at least two lenses, F2 lens group formed of two lenses, and F3 lens group formed of one negative lens, and
wherein a numerical aperture on an object side is equal to or more than 0.3.

18. A projection optical system comprising:
in order from a reduction side,
a first optical group which is formed of a plurality of lenses and has positive power; and
a second optical group which has one reflective surface having a concave aspheric shape,
wherein the first optical group is formed to include a 1-1st lens group which is fixed when focusing is performed during the magnification change and has positive power, and a 1-2nd lens group which moves when focusing is performed during the magnification change, is formed of a plurality of lenses, and has positive power as a whole,
wherein the 1-2nd lens group is a lens group which individually moves when focusing is performed during the magnification change, and includes three lens groups of a positive F1 lens group formed of at least two lenses, F2 lens group formed of two lenses, and F3 lens group formed of one negative lens, and
wherein the reduction side is substantially telecentric.

* * * * *